US010375004B2

(12) United States Patent
Gupta

(10) Patent No.: US 10,375,004 B2
(45) Date of Patent: Aug. 6, 2019

(54) FACILITATING SOCIAL NETWORK SERVICE CONNECTIONS BASED ON MOBILE DEVICE VALIDATED CALENDAR DATA

(71) Applicant: Microsoft Technology Licensing, LLC, Redwood, WA (US)

(72) Inventor: Akhilesh Gupta, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 460 days.

(21) Appl. No.: 14/530,490

(22) Filed: Oct. 31, 2014

(65) Prior Publication Data
US 2016/0094963 A1 Mar. 31, 2016

Related U.S. Application Data

(60) Provisional application No. 62/057,937, filed on Sep. 30, 2014.

(51) Int. Cl.
*H04W 4/02* (2018.01)
*H04W 4/12* (2009.01)
(Continued)

(52) U.S. Cl.
CPC ......... *H04L 51/32* (2013.01); *G06Q 10/1095* (2013.01); *G06Q 50/01* (2013.01);
(Continued)

(58) Field of Classification Search
USPC ...................................................... 705/7.19
See application file for complete search history.

(56) References Cited

U.S. PATENT DOCUMENTS 9,118,724 B1 *  8/2015  Sooriyan ................. H04W 4/21
9,572,000 B2    2/2017  Gupta
(Continued)

FOREIGN PATENT DOCUMENTS

CN      106211020 A    12/2016
EP      2725761 A1     4/2014
(Continued)

OTHER PUBLICATIONS

"U.S. Appl. No. 14/530,356, Notice of Allowance dated Sep. 28, 2016", 10 pgs.
(Continued)

*Primary Examiner* — Eric W Stamber
*Assistant Examiner* — Hector Leal
(74) *Attorney, Agent, or Firm* — Schwegman Lundberg & Woessner, P.A.

(57) ABSTRACT

A first mobile device associated with a first member of a social networking service may be configured to facilitate social networking service connections based on calendar data validated by the first mobile device. For example, the first mobile device accesses calendar data that pertains to an electronic calendar of the first member. The first mobile device identifies a scheduled event based on the calendar data. The first mobile device determines that the first member and a second member of the social networking service attended the scheduled event based on a proximity between the first mobile device and a second mobile device associated with the second member. The first mobile device generates a communication for the first member that includes a prompt to connect with the second member via the social networking service, based on the determining that the first member and the second member attended the scheduled event.

20 Claims, 17 Drawing Sheets

(51) Int. Cl.
*H04W 4/21* (2018.01)
*G06Q 10/10* (2012.01)
*G06Q 50/00* (2012.01)
*H04L 12/58* (2006.01)

(52) U.S. Cl.
CPC ............ *H04W 4/023* (2013.01); *H04W 4/12* (2013.01); *H04W 4/21* (2018.02)

(56) References Cited

U.S. PATENT DOCUMENTS

| | | | |
|---|---|---|---|
| 2003/0050977 | A1 | 3/2003 | Puthenkulam et al. |
| 2010/0138481 | A1 | 6/2010 | Behrens |
| 2011/0125850 | A1 | 5/2011 | Rahnama et al. |
| 2012/0238285 | A1 | 9/2012 | Yariv et al. |
| 2013/0166654 | A1 | 6/2013 | Hjelm et al. |
| 2013/0185654 | A1* | 7/2013 | Harris .................. H04W 4/206 715/753 |
| 2014/0189785 | A1* | 7/2014 | Castro .................. H04L 63/105 726/1 |
| 2014/0310366 | A1* | 10/2014 | Fu .......................... H04L 51/04 709/206 |
| 2015/0178691 | A1* | 6/2015 | Lineberger ......... G06Q 10/1095 705/7.19 |
| 2016/0095140 | A1 | 3/2016 | Gupta |

FOREIGN PATENT DOCUMENTS

| | | |
|---|---|---|
| IN | 894DEL2015 A | 4/2016 |
| WO | WO-2013169974 A1 | 11/2013 |
| WO | WO-2016053384 A1 | 4/2016 |

OTHER PUBLICATIONS

"U.S. Appl. No. 14/530,356, filed Aug. 29, 2016 to Non Final Office Action dated Apr. 28, 2016", 11 pgs.

"U.S. Appl. No. 13/889,991, Non Final Office Action dated Apr. 28, 2016", 10 pgs.

"International Application Serial No. PCT/US15/22996, International Search Report dated Jul. 8, 2015", 2 pgs.

"International Application Serial No. PCT/US15/22996, Written Opinion dated Jul. 8, 2015", 9 pgs.

"U.S. Appl. No. 14/530,356, 312 Amendment filed Dec. 28, 2016", 9 pgs.

"U.S. Appl. No. 14/530,356, PTO Response to Rule 312 Communication dated Jan. 13, 2017", 2 pgs.

"International Application Serial No. PCT/US2015/022996, International Preliminary Report on Patentability dated Apr. 13, 2017", 11 pgs.

* cited by examiner

FACILITATING SOCIAL NETWORK SERVICE CONNECTIONS BASED ON MOBILE DEVICE VALIDATED CALENDAR DATA

CLAIM OF PRIORITY

This application claims the benefit of priority, under 35 U.S.C. Section 119(e), to U.S. Provisional Patent Application No. 62/057,937 by Jayaram et al., filed on Sep. 30, 2014, which is hereby incorporated herein by reference in its entirety.

TECHNICAL FIELD

The present application relates generally to the processing of data, and, in various example embodiments, to systems, methods, and computer program products for facilitating social networking service connections based on calendar data validated by a mobile device.

BACKGROUND

Usually, when business people meet for the first time they exchange physical or electronic business cards. In addition, a business meeting attendee who is a member of a social networking service (e.g., LinkedIn™) may wish to connect with other attendees who are members of the social networking service via the social networking service. Sometimes, instead of connecting via the social networking service during the meeting, a member of the social networking service may create a reminder to establish social graph connections with the new people met at the meeting after the meeting. Examples of such reminders may be a note written on a piece of paper, a note in an electronic document, or a note in an electronic calendar. Additionally or alternatively, an electronic calendar application may issue a reminder to the member of the social networking service to establish social graph connections with the other scheduled attendees via the social networking service.

However, these reminders may be deficient in a number of ways. For example, a reminder created in a rushed manner and that lacks sufficient information with respect to the event or the attendees may fail to be useful to the member of the social networking service. In another example, an automatic reminder based on an electronic calendar of the member of the social networking service may not account for the possibility that the scheduled event did not take place, or the member or the other scheduled attendees did not actually attend the scheduled event. As such, it is not uncommon, for such reminders to be ineffective in assisting the member of the social networking service to remember to connect with other people via the social networking service.

BRIEF DESCRIPTION OF THE DRAWINGS

Some embodiments are illustrated by way of example and not limitation in the figures of the accompanying drawings, in which.

DETAILED DESCRIPTION

Figure 1:
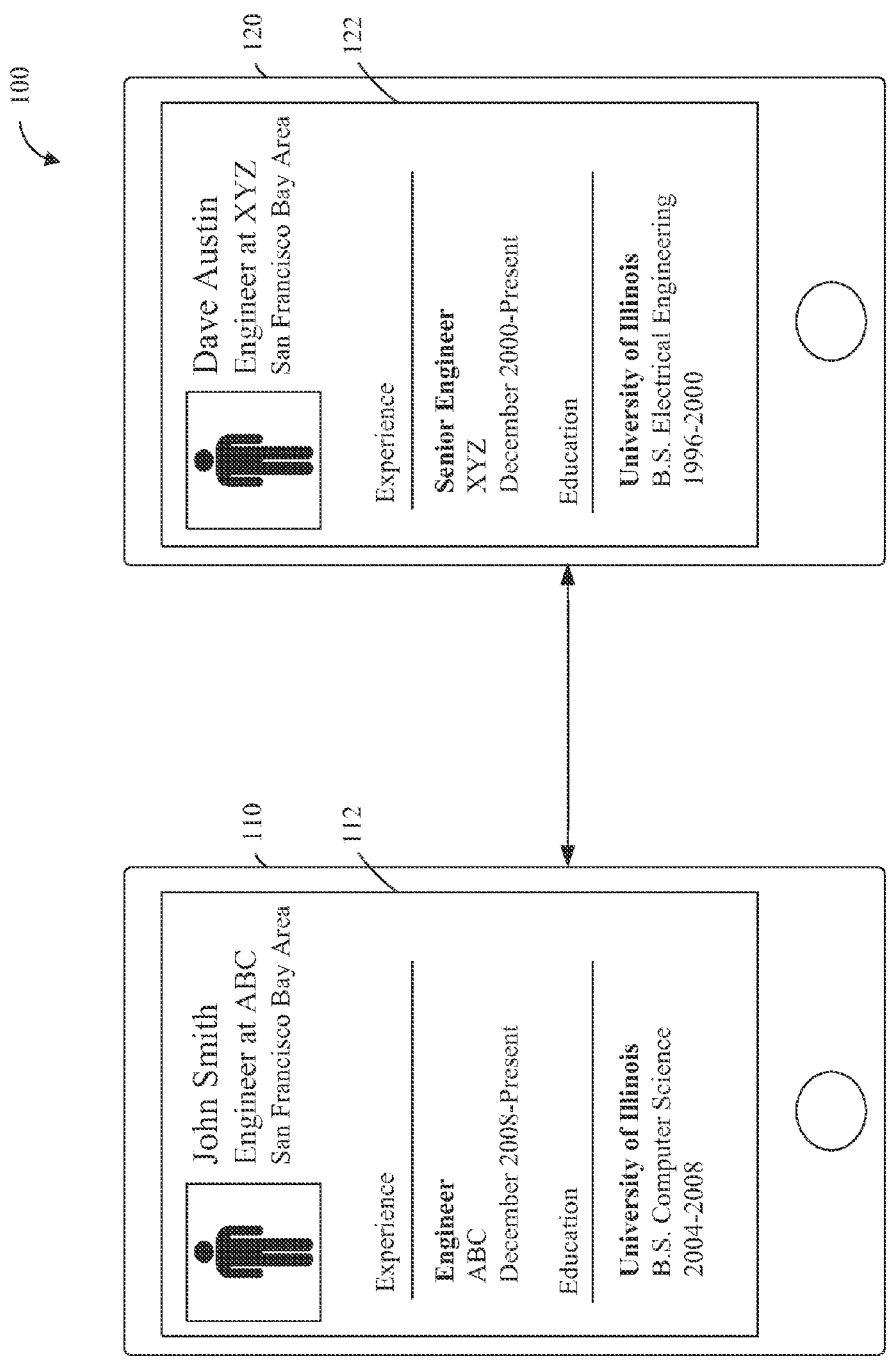
FIG. 1 is a diagram that illustrates an ad hoc peer-to-peer network of mobile devices, according to some example embodiments.

Example methods and systems for facilitating social networking service connections based on calendar data validated by a mobile device are described. In the following description, for purposes of explanation, numerous specific details are set forth to provide a thorough understanding of example embodiments. It will be evident to one skilled in the art, however, that the present subject matter may be practiced without these specific details. Furthermore, unless explicitly stated otherwise, components and functions are optional and may be combined or subdivided, and operations may vary in sequence or be combined or subdivided.

In some example embodiments, a user of a mobile device may meet other users of other mobile devices at a scheduled event (e.g., a business meeting, a conference, etc.) or serendipitously (e.g., at a sports game, in an elevator, on a trip, etc.). If the user and the people the user met are members of a social networking service (also "SNS"), such as LinkedIn™, their mobile devices may be enabled to discover the presence of the other members' mobile devices in a local area and automatically establish a wireless ad hoc peer-to-peer network that includes the members' mobile devices. In some instances, the establishing of the peer-to-peer network of mobile devices is based on the users of the mobile devices being members of the SNS. In some example embodiments, a particular mobile device of a particular member of the SNS may not join or participate in the establishing of the peer-to-peer network of mobile devices but may record the discovery of other mobile devices of other members of the SNS within the local area (e.g., within a distance or proximity from the mobile device).

In some example embodiments, the particular mobile device may transmit a communication to a server associated with the SNS, based on the discovery of other mobile devices of other members of the SNS within the local area. The communication may, in some instances, indicate that the particular member met other members of the SNS at a particular time. For example, the communication may include an identifier of the particular mobile device of the particular member, one or more identifiers of the other mobile devices of the other members of the SNS, and a timestamp associated with a time when the other mobile devices were discovered by the particular mobile device to be in proximity to the particular mobile device (e.g., during a scheduled event).

In some instances, the server may confirm that a scheduled event took place and that one or more scheduled attendees of the schedules event were present at the event, based on the communication received from the particular mobile device. The server may also generate a prompt (e.g., a reminder, a recommendation, a suggestion, etc.) for the particular member to connect with another member of the one or more other members via the SNS based on the determination (or confirmation) that the particular member and the other member met at the scheduled event. The determination that the particular member and the other member met at the scheduled event may be based on, for example, the calendar data associated with the particular member and the communication received by the server from the particular mobile device.

In some example embodiments, a server associated with a social networking service may receive a first communication from a first mobile device associated with a first member of the social networking service. The communication may indicate that the first member was in proximity to one or more other members of the social networking service at a particular time. The server may access calendar data pertaining to the first member. The calendar data may, for example, be stored in one or more records of a database associated with the social networking service. The server may identify a scheduled event associated with the particular time, based on the calendar data. The server may also determine that the one or more other members were scheduled to attend the scheduled event, based on the calendar data. The server may confirm, based on the first communication and the calendar data, that the scheduled event occurred during a window of time associated with the particular time, and that the first member and the one or more other members attended the scheduled event.

In some example embodiments, the server may generate a second communication that includes a prompt for the first member to connect with a second member of the one or more other members via the social networking service. Similarly, the server may generate a third communication that includes a prompt for a second member of the one or more other members determined to be in proximity of the first member at the particular time to connect with the first member via the social networking service. The prompt (for the first member or for the second member) may be based on the confirmation that the first and second members met at the scheduled event.

According to some example embodiments, the server may cause the second communication to be presented to the first member. The second communication may include a textual message, audio message, visual message, haptic message, etc. In some instances, the causing of the second communication to be presented to the first member includes displaying the prompt to connect, in a user interface of the first mobile device.

In certain example embodiments, the first communication includes a member identifier of the first member, one or more member identifiers of the one or more other members, and a timestamp associated by the first mobile device with a time indicating a presence of the first member and the one or more other members in a local area. In some example embodiments, the confirming that the scheduled event occurred during the window of time associated with the particular time includes matching the timestamp included in the first communication with a time associated with the scheduled event (e.g., a time included in a time range or a time window). The confirming that the first member attended the scheduled event may include matching the member identifier of the first member with a first identifier of a first scheduled attendee of the scheduled event. The confirming that the one or more other members attended the scheduled event may include matching the one or more identifiers of the one or more other members with one or more identifiers of one or more other scheduled attendees of the scheduled event.

In various example embodiments, the determining that the one or more other members were scheduled to attend the scheduled event is based on one or more identifiers of the one or more other members. The one or more identifiers of the one or more other members may be included in the calendar data pertaining to the first member. In some example embodiments, the one or more identifiers of the one or more other members include one or more email addresses of the one or more other members.

The members of the SNS who met serendipitously or while attending a scheduled event may find it beneficial to be able to view, in user interfaces of their mobile devices, information regarding the newly made acquaintances (e.g., the other event attendees). Such information may include the attendees' names and pictures, electronic business cards, profiles (e.g., titles, seniority, employer's name, decision maker, colleges attended, etc.) and other relevant information pertaining to the attendees of the meeting. Further, the newly acquainted members of the social networking service may wish to establish social graph connections among themselves via the social networking service. In some instances, the newly acquainted members may establish SNS connections when they first meet.

In some example embodiments, the members of the SNS who met serendipitously or while attending a scheduled event may not establish SNS connections when they first meet. The mobile devices of the members of the SNS may be configured to confirm that certain members have met and may facilitate the establishing of the SNS connections between the members who met, at a later time. In some instances, the confirming that the members have met may be based on a physical proximity of the mobile devices of the members, calendar data, Global Positioning System (GPS) data pertaining to one or more of the mobile devices, one or more time stamps, or a suitable combination thereof.

For example, two members of the SNS meet for the first time during a scheduled event (e.g., a business meeting). It may not be practical for the two members to spend time sending and accepting invitations to connect via the SNS during the business meeting. A first mobile device associated with a first member of the social networking service may be configured to determine that the first member and a second member of the social networking service attended the scheduled event based on a proximity between a first mobile device associated with the first member and a second mobile device associated with the second member. The proximity may be identified by the first mobile device. The first and second mobile devices of the two members of the social networking service may be configured to facilitate the establishing of a social networking service connection between the two members of the social networking service based on the determining that the first member and the second member of the social networking service attended the scheduled event.

For instance, the first mobile device may generate a first communication for the first member that includes a prompt (e.g., a reminder or a suggestion) to connect with the second member via the social networking service. In some example embodiments, the first mobile device prompts the first member to connect with the second member based on the first mobile device determining that a physical distance value between the first and second mobile devices identified when the first user and the second user met does not exceed a proximity threshold value. For example, the first mobile device may issue a prompt to the first user to connect with the second user via the SNS based on determining that the first mobile device and the second mobile device were within an immediate proximity to each other. This may indicate that the first member and the second member were in close proximity to each other when they met (e.g., sat next to each other during a scheduled event). In some example embodiments, the first mobile device prompts the first member to connect with the second member based on the first mobile device determining that a duration value identifying the period of time the first mobile device and the second mobile device were in proximity to each other exceeds a minimum time threshold value. For example, the first mobile device may issue a prompt to the first user to connect with the second user via the SNS based on determining that the first and second mobile devices were near each other (e.g., in the same room) for at least five minutes.

The first mobile device may display the first communication for the first member of the social networking service in a user interface of the first mobile device associated with the first member. In response to the displaying of the first communication, the first mobile device may receive an input from the first member via the user interface of the first mobile device. The input may indicate a request to establish the connection between the first member and the second member via the social networking service. Based on receiving the input from the first member, the first mobile device may generate an invitation for the second member to connect with the first member via the social networking service. The first mobile device may transmit a second communication to the second mobile device associated with the second member. The second communication may include the invitation for the second member to connect with the first member via the social networking service.

In response to the second communication, the first mobile device may receive a third communication from the second device. The third communication may include an acceptance by the second member of the invitation for the second member to connect with the first member via the social networking service. Based on the acceptance by the second member of the invitation, a new edge may be added (e.g., by the first mobile device or by a server associated with the SNS) between a first node representing the first member and a second node representing the second member in a first social graph (e.g., a graph data structure in a graph database) associated with the first member. The new edge may indicate that the second member is a new connection in the first social graph associated with the first member.

In some example embodiments, a particular mobile device is configured to transmit a communication to a server associated with the SNS to indicate an identified change with respect to the presence of other mobile devices within the local area. The communication may also include a timestamp associated with the change. Examples of identifying a change with respect to the presence of other mobile devices within the local area include determining that a new mobile device has entered the local area or determining that a mobile device has left the local area. In some instances, the identifying of the change is based on a distance value (e.g., the proximity) between the particular mobile device and the other mobile devices in the local area. The determining of one or more changes and of the associated timestamps identifying the time(s) when the change(s) occurred may allow the particular mobile device (or the server receiving the reports of changes and timestamps) to determine that a particular event occurred, to determine the duration of the event, and to identify the attendees of the event, as well as the times that the various attendees spent at the event. Further, this data pertaining to changes with respect to the presence of mobile devices within the local area may facilitate the validating of calendar data using mobile devices. For example, the change data captured by one or more mobile devices may be utilized to confirm that a scheduled event took place. In another example, the change data may be utilized to determine which of the scheduled attendees were actually present at the scheduled event and how long.

In some example embodiments, when two members meet serendipitously (e.g., not at a scheduled event), there is no scheduled event that may be validated. In such a case, at least one of the mobile devices of the two members generates a record of the meeting of the two members to memorialize the fact that the two members have met. In some instances, the at least one of the mobile devices may transmit a communication (e.g., the record of the meeting) to the server associated with the SNS to indicate that the two members of the SNS have met. The server may store a record of the meeting of the two members in a database as, for example, member activity and behavior data.

The at least one mobile device may generate a prompt for the respective member and display it in a user interface of the mobile device associated with the respective member to encourage or remind the respective member to connect with the other member via the SNS. The prompt may be generated based on the record of the serendipitous meeting between the two members. In some instances, the mobile device may display the prompt to the respective member sometime after the two members meet (e.g., the day after the members met).

In some instances, the server may generate a prompt for the respective member to connect with the other member. The server may display the prompt to the respective member in a browser based on determining that the respective member has logged in and is browsing a particular web site pertaining to the social networking service.

In some example embodiments, a prompt may be generated when a first member meets a second and a third member but only connects with the second member via the SNS. The prompt may be generated (e.g., by the mobile device of the first member or by the server) to remind the first member that the first member also met the third member and that the first member might be interested in connecting with the third member via the SNS.

In some example embodiments, a plurality of mobile devices associated with a plurality of members of the SNS may be configured to establish an ad hoc wireless peer-to-peer network (e.g., a session or a connection) that includes the plurality of mobile devices, and to transmit data between the connected mobile devices without the involvement of a server. A mobile device associated with a member of the social network and connected via the peer-to-peer network may exchange (e.g., transmit or receive) electronic business cards with the other mobile devices in the peer-to-peer network, transmit its user's member profile on the social networking service to the other mobile devices or receive other member profiles from the other mobile devices, transmit or receive invitations for members to chat via the ad hoc wireless peer-to-peer network, transmit or receive invitations for members to connect via the social networking service, establish social networking connections on the social networking service between members of the social networking service via the ad hoc wireless peer-to-peer network, display communications (e.g., communications that are about to be transmitted to other mobile devices via the peer-to-peer network or communications received from other mobile device via the peer-to-peer network), etc.

The establishing of an ad hoc wireless one-to-one connection or of a multi-peer connection among mobile devices without the use of a server may enhance the experiences of the users of the mobile devices who are attending the meeting, for example, by facilitating speedy interactions among the users, by providing information directly to the mobile devices included in the an ad hoc wireless peer-to-peer connection, or by providing prompts to establish social networking connections among the users. In some example embodiments, a mobile device of a meeting attendee may determine the identities of the other meeting attendees based on the identifiers (e.g., member identifiers) advertised to a local area by the mobile devices of the other meeting attendees. Also, the mobile device of a particular member may identify which of the other attending members are existing social networking service connections of the particular member, and may display the names of the existing connections in a user interface of the mobile device of the particular member.

Further, the mobile device may identify the members who are not connected via the social networking service and may prompt the respective members to connect via the social networking service. In addition, the mobile device may obtain information about the other attendees' backgrounds and display that information in the user interfaces of the mobile devices of the other attendees. The mobile device may also store the names and photographs of the meeting attendees, in some instances, in association with data that identifies certain attendees as being met, by the user of the mobile device, at the respective meeting for the first time. These and other functionalities of a mobile device connected via an ad hoc multi-peer network may allow the user of the device to take notes with reference to the speaker, identify the decision maker in the group, have chat sessions with other attendees during the meeting, learn about new people attending who were not scheduled to attend, remember the names of the attendees met at the respective meeting for the first time, match names to faces via photographs presented via the mobile device, etc.

Furthermore, in some example embodiments, the mobile device(s) may memorialize (e.g., store a record of) the activities that involved the mobile device(s), the ad hoc wireless peer-to-peer network, or both, on the mobile device(s) and/or in one or more records of a database associated with the social networking service (e.g., via a server of an interaction support system). For example, a record of the activity that pertains to the users of the mobile devices exchanging electronic business cards via the ad hoc wireless peer-to-peer network may be stored, by at least one of the involved mobile devices, as member activity and behavior data in a database associated with the social networking system.

In another example, the mobile device of the member Alice White and the mobile device of the member Bob Smith are connected via the peer-to-peer network. Alice's mobile device may display an identifier (e.g., the name and/or photograph) of Bob in a user interface of Alice's mobile device. Similarly, Bob's mobile device may display an identifier (e.g., the name and/or photograph) of Alice in a user interface of Bob's mobile device. Alice may request to connect with Bob via the social networking service by, for example, clicking on a "Connect" button displayed in the user interface of Alice's mobile device in association with the identifier of Bob. Alice's mobile device may transmit a communication including an invitation to connect with Bob on the social networking service to Bob's mobile device via the ad hoc wireless peer-to-peer network.

Alice's mobile device may also transmit a communication to a server associated with the social networking service. The communication to the server may indicate that Alice invited Bob to connect on the social networking service. The server may generate a database record that indicates that Alice has invited Bob to connect via the social networking service. In some example embodiments, the generating of the database record may allow the maintaining of an up-to-date list of invitations received by Bob. For example, if, upon receiving Alice's invitation to connect, Bob were to view a website associated with the social networking service, he may be able to see an indication of Alice's invitation to connect via the social networking service.

Bob may accept Alice's invitation to connect via the social networking service (e.g., by selecting an "Accept" button in the user interface of the Bob's mobile device). In response to the communication including the invitation to connect on the social networking service received from Alice's mobile device, Bob's mobile device may transmit a further (e.g., a second) communication including an acceptance of Alice's invitation to connect on the social networking service via the ad hoc wireless peer-to-peer network. Upon receiving the second communication from Bob's mobile device, Alice's mobile device may display an indication of Bob's acceptance of Alice's invitation to connect in the user interface of Alice's mobile device (e.g., "Bob accepted your invitation to connect via the SNS.").

Bob's mobile device may also transmit another communication to the server associated with the social networking service. The other communication to the server may indicate that Bob accepted Alice's invitation to connect on the social networking service. Based on the other communication, the server may generate another database record that indicates that Alice and Bob have established a connection via the social networking service. Further, the server may update the record(s) that pertain to the two members (e.g., Alice and Bob) in a social graph database to indicate the establishing of the new relationship between the two members of the social networking service. The new relationship between the two members may be represented by a new edge connecting a first graph node representing one of the two members (e.g., Alice) and a second graph node representing the other of the two members (e.g., Bob).

In certain example embodiments, the context or the physical circumstances associated with one or more members of the social network, at a particular time, may be leveraged (e.g., by the mobile devices or by an interaction support system) to facilitate context-aware, social-graph-based interactions between the members via the members' mobile devices. According to one example, based on access to a member's calendar, geolocation (e.g., GPS) data, member profile data, or a suitable combination thereof, one or more mobile devices of the attending members or the interaction support system may identify the people that a particular member is likely to meet at a scheduled event. The mobile devices or the interaction support system may provide the names, email addresses, or other additional data determined (e.g., by the mobile devices or by the interaction support system) to be pertinent to the meeting or useful to a particular member. During the meeting, the mobile devices of the attending members may automatically establish a multi-peer connection between the mobile devices and facilitate the transmission of data (e.g., electronic business cards) between the attending members. A record of the attendees and the data transmitted may be stored on one or more of the mobile devices of the members attending the meeting. In some instances, the record of the attendees and the data transmitted may be stored in a database associated with the interaction support system.

In some example embodiments, a plurality of mobile devices that have WiFi™ or Bluetooth® capabilities activated and that are located within a particular distance from each other may discover each other and may establish one or more ad hoc wireless peer-to-peer connections (e.g., one or more wireless peer-to-peer networks) among themselves, all without the involvement of an intermediary entity (e.g., a server). Some or all of the functionalities associated with the establishing of the one or more wireless peer-to-peer connections among the mobile devices may be performed by one or more modules associated with one or more copies of an application executed on the respective mobile devices.

In some example embodiments, a user of a mobile device that hosts a copy of such an application interacts with the copy of the application via a user interface of the mobile device when configuring one or more settings associated with the copy of the application. The user may specify that the mobile device may automatically establish ad hoc wireless peer-to-peer networks with other mobile devices that host other copies of the application. Based on the configuration provided by the user of the mobile device, the mobile device may participate in the establishing of one or more wireless peer-to-peer connections with other mobile devices discovered in a local area. The wireless peer-to-peer connections among a plurality of mobile devices may be established ad hoc (e.g., without planning) based on the plurality of mobile devices being within a distance from each other and discovering the presence of each other.

For example, a particular mobile device may broadcast (or advertise) its availability to establish wireless peer-to-peer connections with one or more other mobile devices located within a particular distance from the particular mobile device. The one or more other mobile devices, may receive the broadcast of the particular mobile devices, may respond to the broadcast, and may participate in the establishing of the wireless peer-to-peer connections among the mobile devices. In some instances, the mobile devices may facilitate the establishing of the wireless peer-to-peer connections with the other advertising mobile devices based on determining that the users associated with the other mobile devices are members of the social networking service.

In some example embodiments, the iBeacon™ technology provided by Apple Inc. may be used by a plurality of mobile devices to facilitate the establishment of an ad hoc wireless peer-to-peer connection among the plurality of mobile devices using Bluetooth® low energy proximity sensing. The plurality of mobile devices may be both transmitting (e.g., broadcasting, advertising, etc.) communications to other mobile devices in a local area and receiving communications from the other mobile devices in the local area. As such, the advertising mobile device and the listening mobile device may have both advertising and listening capabilities.

According to certain example embodiments, one or more of the mobile devices host copies of an application that performs one or more of the functionalities associated with establishing the wireless ad hoc peer-to-peer connection. The copies of the application may associate the one or more mobile devices with a universally unique identifier (UUID) for purposes of identifying other mobile devices in the local area that have the same UUID and facilitating the establishing of an ad hoc wireless peer-to-peer network among a plurality of mobile device in the local area.

For example, a mobile device broadcasts a communication including a UUID to a local area. The mobile device may also broadcast a major number and a minor number. The major and minor numbers may be mapped to a member identifier associated with the advertising device by a listening mobile device. The member identifier may be generated, in some instances, upon the user of the advertising mobile device being authenticated by the advertising mobile device (e.g., based on login data provided by the user). According to some example embodiments, without determining that the user's login data maps to a valid member identifier, the advertising mobile device may not advertise its availability to participate in establishing (or joining) the ad hoc wireless peer-to-peer network.

The transmitted UUID may be picked up by another mobile device that is listening for UUIDs. In some example embodiments, the other mobile device (e.g., the listening mobile device) determines that the UUID received from the transmitting mobile device is the same as its own UUID. Upon matching the received UUID and its own UUID, the listening mobile device may access and map a combination of the major and minor numbers received from the transmitting mobile device to a member identifier of a particular member of a social networking service. In some example embodiments, the major and minor numbers are encrypted at the advertising mobile device, and are decrypted at a listening mobile device. In some instances, if the listening mobile device does not match the received UUID with its own UUID, the listening mobile device may not access (or decrypt) the major and minor numbers.

The member identifier of the particular member may be associated with the advertising mobile device. The listening mobile device may determine that the user associated with the advertising mobile device is a member of the social networking service. In some example embodiments, a plurality of mobile devices may participate in the establishing of a wireless peer-to-peer connection among themselves based on determining that the users associated with the respective mobile devices are members of the social networking service. In some example embodiments, a listening mobile device participates in establishing (or joining) an ad hoc wireless peer-to-peer network only with transmitting mobile devices that are associated with the same UUID as the listening mobile device.

The iBeacon™ technology may allow the determination of the proximity of certain mobile device. For example, a particular mobile device may determine, based on the advertising transmitted by another mobile device, whether the other device is in an immediate proximity to the particular mobile device, is near the particular mobile device, or is far from the mobile device. For example, the particular mobile device may determine a received signal strength indicator (RSSI) value associated with a radio signal received from the other mobile device. The particular mobile device may identify a distance value between the particular mobile device and the other mobile device based on the RSSI value.

In some example embodiments, if the distance between two mobile devices is determined by a mobile device to not exceed a threshold value (e.g., a proximity threshold value), the two mobile devices automatically establish the wireless peer-to-peer connection between the two mobile devices. In certain example embodiments, if the distance between two mobile devices is determined by a mobile device to exceed the threshold value, the two mobile devices issue queries displayed to the users associated with the respective mobile devices. The queries may, for example, be in the form of a question regarding the connecting to the other mobile device (e.g., "Would you like to connect to the mobile device of John Doe?" or "Would you like to connect to John Doe?").

In various example embodiments, a plurality of mobile devices may utilize the multi-peer connectivity technology to facilitate the establishment of a wireless peer-to-peer connection among the plurality of mobile devices. The multi-peer connectivity technology may allow mobile devices to send connection requests, accept connection requests, facilitate chatting among the users of the connected mobile devices, send files, etc.

During the initial, discovery phase of the establishing of a multi-peer session, a plurality of mobile devices advertise their peer identifier (ID) and receive the peer IDs of other mobile devices from other mobile devices located at a particular distance from each other. In some instances, the peer ID is a member identifier (ID). In other instances, the peer ID identifies a particular mobile device, and may be mapped to the member ID of the user associated with the particular mobile device.

Upon discovering each other, the plurality of mobile devices may automatically establish connections among all the discovered mobile devices that advertised their peer IDs. The connections are established locally, peer-to-peer (e.g., mobile device to mobile device), without the involvement of the server. The mobile devices may display a number of identifiers of the users associated with the connected peers (e.g., the mobile devices) in user interfaces of the mobile devices. The peers may join the session and may leave the session. When a peer leaves the session, the peer is dropped out of the pool of connections, and the number of connected users that may be seen on the screen of each remaining mobile device is decreased to indicate that a particular peer has left the session.

FIG. 1 is a diagram that illustrates an ad hoc peer-to-peer network of mobile devices, according to some example embodiments. The ad hoc peer-to-peer network of mobile devices may include two or more mobile devices of various types. As shown in FIG. 1, mobile devices 110 and 120 are smartphones. In certain example embodiments, one or more of the mobile devices that may facilitate a wireless peer-to-peer connection among mobile devices may be wearable devices, tablets, or other mobile devices. In some instances, a wearable device is a stand-alone or independent device. In some instances, the wearable device is an accessory-like device that works in conjunction with another mobile device (e.g., a smart phone). For example, the wearable device may be an Input/Output (I/O) device for an application executed on a smart phone.

According to certain example embodiments, the peer-to-peer connection among a plurality of mobile devices is established automatically based on the users associated with the respective mobile devices previously configuring copies of a particular application (e.g., a social networking application) hosted on their mobile devices to automatically establish the wireless peer-to-peer connections. In some example embodiments, the mobile device 110 advertises (e.g., broadcasts) a first identifier to a local area. The first identifier, in some instances, is a device identifier of the mobile device 110. In other instances, the identifier is a member identifier of the member of the social network, associated with the mobile device 110. The mobile device 110 may broadcast the first identifier via a transceiver of the mobile device 110.

Similarly, the mobile device 120 may advertise (e.g., broadcast) a second identifier of the mobile device 120 to the local area. The second identifier, in some instances, is a device identifier of the mobile device 120. In other instances, the second identifier is a member identifier of the member of the social network associated with the mobile device 120. In some example embodiments, the advertised identifiers may be referenced in the communications broadcast (e.g., transmitted) by the mobile devices 110 or 120, respectively.

In addition to broadcasting communications, the mobile device 110 listens to communications broadcast by other mobile devices (e.g., the mobile device 120, etc.) located within the proximity (e.g., a local area or a particular distance) of the mobile device 110. Similarly, the mobile device 120 listens to communications broadcast by other mobile devices located within the proximity of the mobile devices 120, for example, the mobile device 110.

When the mobile device 110 discovers an advertising device (e.g., the mobile device 120), the mobile device 110 may send a request to the advertising device to establish a wireless peer-to-peer connection, which the advertising device may accept or decline. In some example embodiments, a mobile device makes the determination whether to accept or decline the request to establish the peer-to-peer connection based on the configuration settings associated with the application executed on the mobile device.

In some instances, when the configuration settings (e.g., provided by the user of the mobile device) specify a permission to automatically establish the peer-to-peer connections, the mobile device may automatically establish the wireless peer-to-peer connection with the requesting mobile device in response to the received request to establish the wireless peer-to-peer connection. In other instances, when the configuration settings do not specify a permission to automatically establish the peer-to-peer connections, the mobile device generates and presents a communication to the user of the mobile device via a user interface of the mobile device. The communication may, for example, be in the form of a question regarding the connecting to the other mobile device (e.g., "John, would you like to connect to the mobile device of Dave Austin?" or "Would you like to connect to Dave Austin?")

By accepting the invitation to connect, a session is established and the mobile devices may start communicating. The mobile devices may communicate by transmitting data, such as images, video, texts, etc.

The session (or peer-to-peer connection, or peer-to-peer network) may be established between two or more peers (e.g., mobile devices). For example, as shown in FIG. 1, the mobile devices 110 and 120 are included in the multi-peer connection established by the mobile devices 110 and 120. Other mobile devices not shown in FIG. 1 may be included in the peer-to-peer network of mobile devices. If one of the mobile devices leaves the session, the session may be maintained as long as at least two mobile devices are still connected.

As shown in FIG. 1, the mobile device 110 displays a user interface 112 to a first user associated with the mobile device 110. Similarly, the mobile device 120 displays a user interface 122 to a second user associated with the mobile device 120. The mobile devices 110 and 120 may display a variety of information in the user interfaces 112 or 122, respectively.

As shown in FIG. 1, the user interface 112 of the mobile device 110 may inform the user associated with the mobile device 110 about the members of the social networking service who are discovered (e.g., by the mobile device 110) to be in a proximity to the mobile device 110 by displaying information pertaining to the discovered members. For example, the mobile device 110 displays in the user interface 112 presented to Dave Austin, the member associated with the mobile device 110, profile data pertaining to the member John Smith. The profile data of John Smith may include his name, image (e.g., a photograph or video), title, employer's name, and location. The profile data of John Smith may also include data pertaining to his work experience and education. In some instances, the user interface 112 may also indicate that one or more of the discovered nearby members are existing connections of Dave Austin via the social networking service.

Similarly, the user interface 122 of the mobile device 120 may inform the user associated with the mobile device 120 about the members of the social networking service who are discovered (e.g., by the mobile device 120) to be in a proximity to the mobile device 120 by displaying information pertaining to the discovered members. For example, the mobile device 120 displays in the user interface 122 presented to John Smith, the member associated with the mobile device 120, profile data pertaining to the member Dave Austin. The profile data of Dave Austin may include his name, image (e.g., a photograph or video), title, employer's name, and location. The profile data of Dave Austin may also include data pertaining to his work experience and education. In some instances, the user interface 112 may also indicate that one or more of the discovered nearby members are existing connections of John Smith via the social networking service.

According to certain example embodiments, the mobile devices 110 and 120 may facilitate interactions by the members associated with the mobile devices 110 and 120. The mobile devices 110 and 120 may provide John Smith and Dave Austin with information regarding the wireless peer-to-peer session established between the mobile devices 110 and 120 (and, possibly, other mobile devices), such as the names of the members whose mobile devices are still connected via the ad hoc peer-to-peer network, the name of the scheduled attendees who are not present at the scheduled event, the names of the people who are not scheduled to attend but are present at the scheduled event, the actual duration of the scheduled event, etc.

In some example embodiments, a mobile device may generate a message for the user of the mobile device to trigger an action by the user (e.g., the transmitting of a text message to another user associated with another mobile device, the transmitting of an invitation to connect via the social networking service, etc.). In certain example embodiments, a first mobile device may respond to a query generated by a second mobile device and transmitted to the first mobile device via the peer-to-peer network. The query may pertain to the user associated with the first mobile device. These and other items of content generated by the mobile devices may be displayed by the mobile devices in one or more user interfaces of the mobile devices connected wirelessly via the peer-to-peer session.

In certain example embodiments one or more of the mobile devices illustrated in FIG. 1 may be clients in a client-server system. One or more of the mobile devices 110 and 120 may transmit and receive communications to and from a server associated with the social networking service. For example, the mobile device 110 may send a request for information about one of the users associated with the other mobile devices (e.g., the SNS member associated with the mobile device 120, John Smith).

Figure 2:
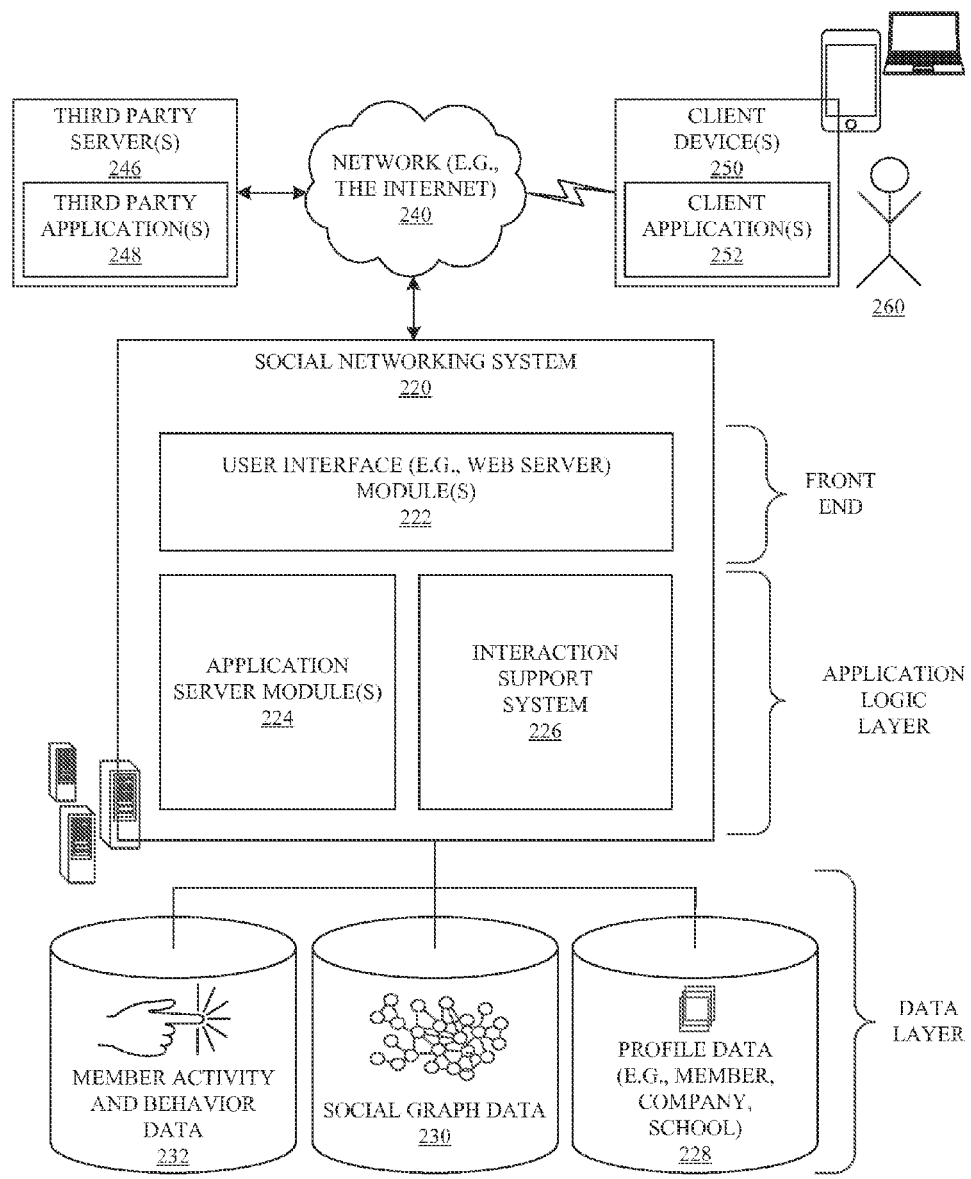
FIG. 2 is a network diagram illustrating a client-server system, according to some example embodiments.

An example method and system for facilitating social networking service connections based on calendar data validated by a mobile device may be implemented in the context of the client-server system illustrated in FIG. 2. As shown in FIG. 2, the social networking system 220 is generally based on a three-tiered architecture, consisting of a front-end layer, application logic layer, and data layer. As is understood by skilled artisans in the relevant computer and Internet-related arts, each module or engine shown in FIG. 2 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 2. However, a skilled artisan will readily recognize that various additional functional modules and engines may be used with a social networking system, such as that illustrated in FIG. 2, to facilitate additional functionality that is not specifically described herein. Furthermore, the various functional modules and engines depicted in FIG. 2 may reside on a single server computer, or may be distributed across several server computers in various arrangements. Moreover, although depicted in FIG. 2 as a three-tiered architecture, the inventive subject matter is by no means limited to such architecture.

As shown in FIG. 2, the front end layer consists of a user interface module(s) (e.g., a web server) 222, which receives requests from various client-computing devices including one or more client device(s) 250, and communicates appropriate responses to the requesting device. For example, the user interface module(s) 222 may receive requests in the form of Hypertext Transport Protocol (HTTP) requests, or other web-based, application programming interface (API) requests. The client device(s) 250 may be executing conventional web browser applications and/or applications (also referred to as "apps") that have been developed for a specific platform to include any of a wide variety of mobile computing devices and mobile-specific operating systems (e.g., iOS™, Android™, Windows® Phone).

For example, client device(s) 250 may be executing client application(s) 252. The client application(s) 252 may provide functionality to present information to a user and to participate in establishing wireless peer-to-peer networks with other client application(s) 252 executed on other client device(s) 250. The client application(s) 252 may also provide functionality to communicate via the network 240 to exchange information with the social networking system 220 or with other client application(s) 252 executed on other client device(s) 250. Each of the client devices 250 may comprise a computing device that includes at least a display and communication capabilities with the network 240 to access the social networking system 220 or other client device(s) 250. The client devices 250 may comprise, but are not limited to, remote devices, work stations, computers, general purpose computers, Internet appliances, hand-held devices, wireless devices, mobile, devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, wearable devices (e.g., head-mounted displays), smart watches, and the like. One or more users 260 may be a person, a machine, or other means of interacting with the client device(s) 250. The user(s) 260 may interact with the social networking system 220 or with other user(s) 260 via the client device(s) 250. The user(s) 260 may not be part of the networked environment, but may be associated with client device(s) 250.

As shown in FIG. 2, the data layer includes several databases, including a database 228 for storing data for various entities of a social graph. In some example embodiments, a "social graph" is a mechanism used by an online social network service (e.g., provided by the social networking system 220) for defining and memorializing, in a digital format, relationships between different entities (e.g., people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. Of course, with various alternative embodiments, any number of other entities may be included in the social graph, and as such, various other databases may be used to store data corresponding to other entities.

Consistent with some embodiments, when a person initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 228.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a uni-lateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, items of content, and user interfaces of the social networking system 220, information relating to the member's activity and behavior (e.g., data pertaining to the member selecting or clicking on an online ad) may be stored in a database, such as database 232.

The social networking system 220 may provide a broad range of other applications and services that allow members the opportunity to share and receive information, often customized to the interests of the member. For example, with some embodiments, the social networking system 220 may include a photo sharing application that allows members to upload and share photos with other members. With some embodiments, members of the social networking system 220 may be able to self-organize into groups, or interest groups, organized around a subject matter or topic of interest. With some embodiments, members may subscribe to or join groups affiliated with one or more companies. For instance, with some embodiments, members of the social network service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of database 230. The social graph data may be stored in the database 230 in one or more graph data structures. The graph data structures may utilize nodes (e.g., for entities), edges (e.g., for connections or relationships between entities), and properties to represent and store the data pertaining to different types of relationships that may exist between different entities.

The application logic layer includes various application server module(s) 224, which, in conjunction with the user interface module(s) 222, generates various user interfaces with data retrieved from various data sources or data services in the data layer. With some embodiments, individual application server modules 224 are used to implement the functionality associated with various applications, services, and features of the social networking system 220. For instance, a messaging application, such as an email application, an instant messaging application, or some hybrid or variation of the two, may be implemented with one or more application server modules 224. A photo sharing application may be implemented with one or more application server modules 224. A search engine that searches for items of content pertaining to users of the client device(s) 250 based on queries received from other client device(s) 250 may be implemented with one or more application server modules 224. Similarly, the search engine may enable users to search for and browse member profiles. Of course, other applications and services may be separately embodied in their own application server modules 224. As illustrated in FIG. 2, social networking system 220 may include the interaction support system 226, which is described in more detail below.

Additionally, a third party application(s) 248, executing on a third party server(s) 246, is shown as being communicatively coupled to the social networking system 220 and the client device(s) 250. The third party server(s) 246 may support one or more features or functions on a website hosted by the third party.

Figure 3:
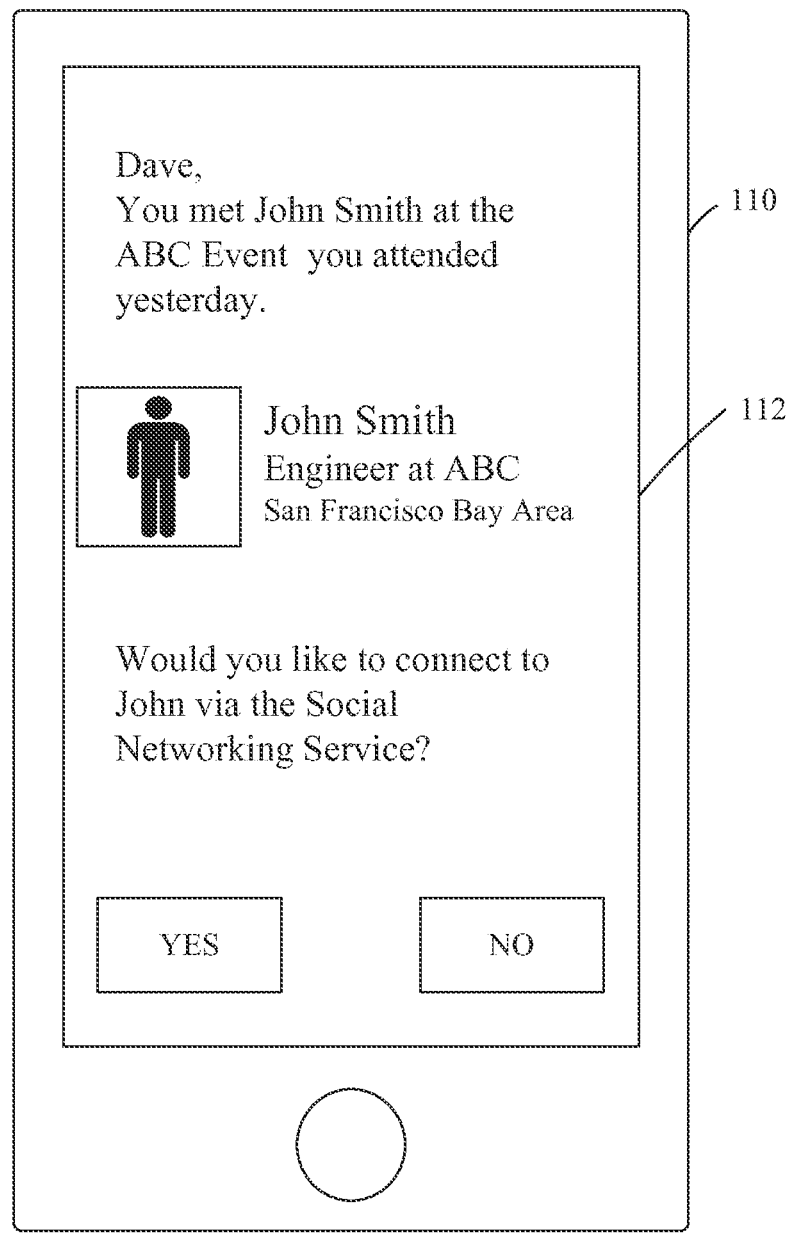
FIG. 3 is a diagram that illustrates a communication presented in a user interface of a mobile device, according to some example embodiments.

FIG. 3 is a diagram that illustrates a communication presented in a user interface of a mobile device, according to some example embodiments. As shown in FIG. 3, the mobile device 110 may display a prompt for the member associated with the mobile device 110, Dave Austin, the user interface 112 to remind him to connect with John Smith via the SNS. The user interface 112 may also include an indication as to when and where Dave Austin met John Smith (e.g., "You met John Smith at the ABC Event you attended yesterday."). If Dave selects the "Yes" button included in the user interface 112, the mobile device 110 may transmit an invitation to connect on the SNS to the mobile device 122 of the member John Smith. If Dave selects the "No" button in the user interface 112, the mobile device 110, in some instances, may not display the prompt to connect with John Smith again.

Similarly, the user interface 122 of the mobile device 120 may inform the second user about the members of the social networking service who are discovered (e.g., by the mobile device 120) to be in a proximity to the mobile device 120 by displaying a statement such as "Social Networking Service (SNC) Members Nearby: Alice White and Catherine Jones." The member Alice White may be the first user associated with the mobile device 110, and the member Catherine Jones may be the third user associated with the mobile device 130. In some instances, the user interface 122 may also indicate that one or more of the discovered nearby members are existing connections of the first user via the social networking service (e.g., "Alice is an existing connection via the SNC."). The mobile device 120 may generate and display a further message such as "Would you like to connect to Catherine via the SNC?" via the user interface 122. The mobile device 120 may receive input from the second user via the user interface 122 in response to the further message displayed to the second user. For example, the second user (e.g., the member Bob Smith) may provide a command to send an invitation to connect to the member Catherine Jones (e.g., the third user) by selecting (e.g., clicking on) the further message displayed in the user interface 122.

Figure 4:
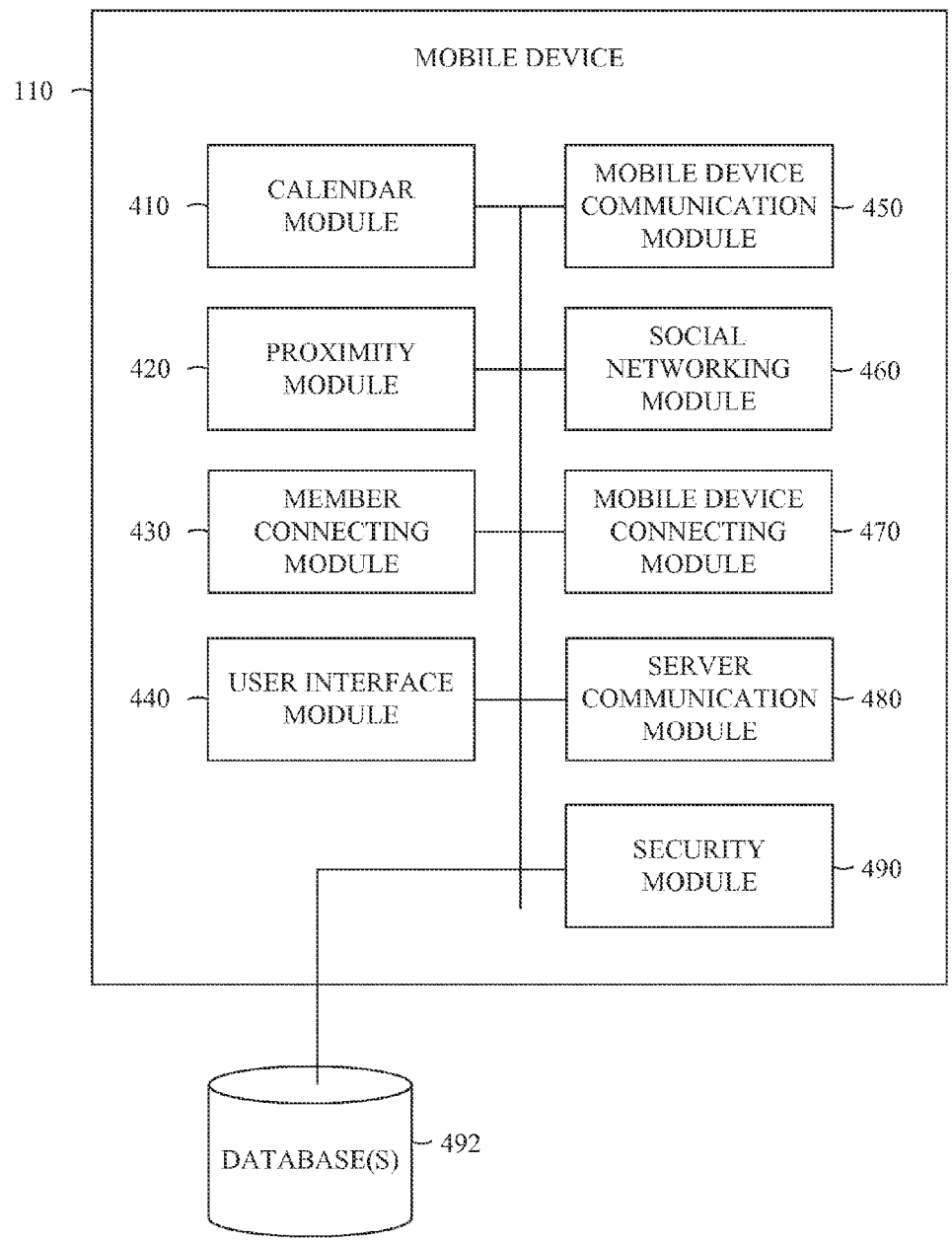
FIG. 4 is a block diagram illustrating components of a mobile device, according to some example embodiments.

FIG. 4 is a block diagram illustrating components of the mobile device 110, according to some example embodiments. As shown in FIG. 4, the mobile device 110 may include a calendar module 410, a proximity module 420, a member connecting module 430, a user interface module 440, a mobile device communication module 450, a social networking module 460, a mobile device connecting module 470, a server communication module 480, and a security module 490, all configured to communicate with each other (e.g., via a bus, shared memory, or a switch).

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, so as to allow information to be passed between the applications so as to allow the applications to share and access common data. Furthermore, the modules may access one or more databases 492 (e.g., the database 228, the database 230, or the database 232).

Figure 5:
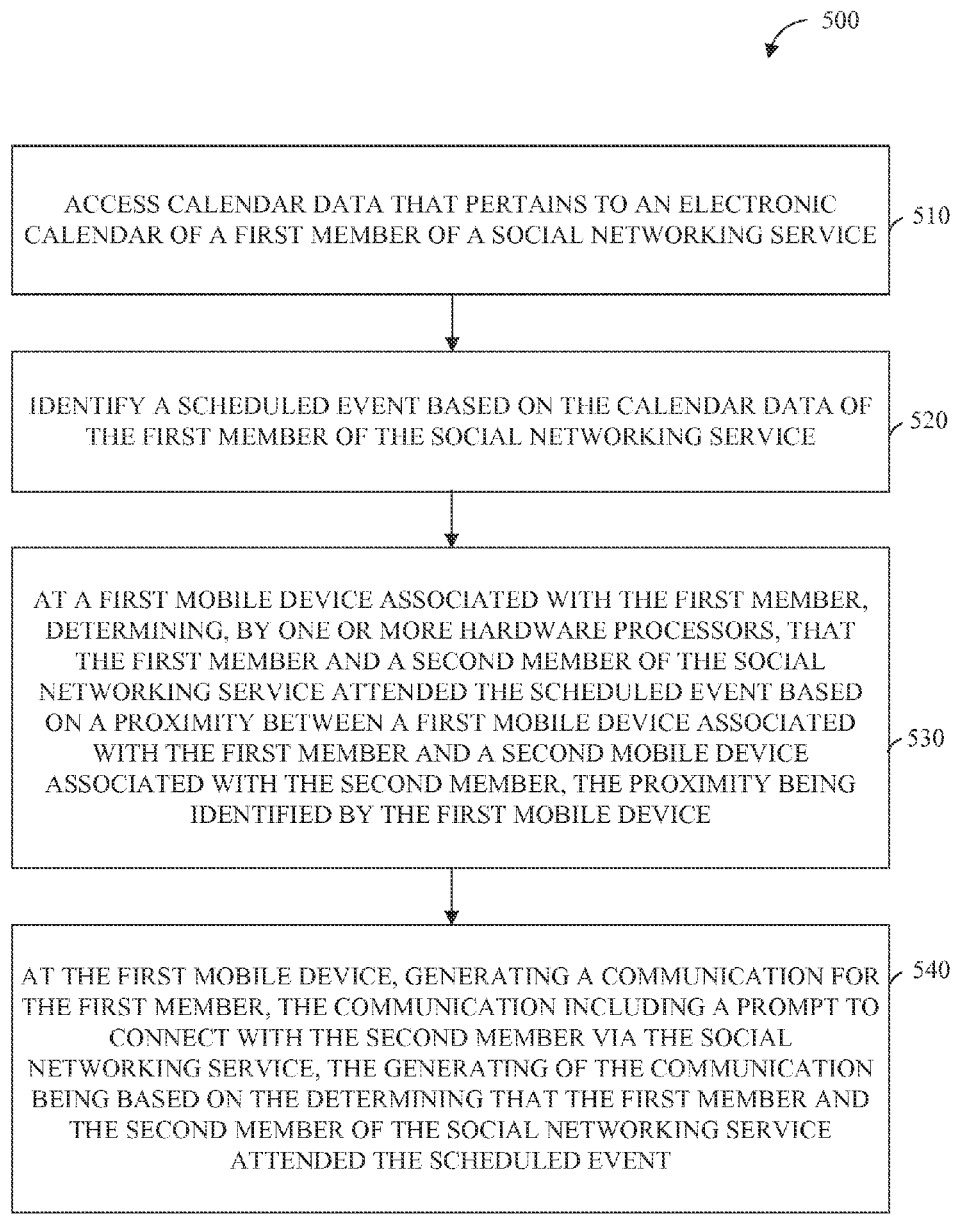
FIG. 5 is a flowchart that illustrates a method for facilitating social networking service connections based on calendar data validated by a mobile device, according to some example embodiments.

FIGS. 5-15 are flowcharts of a method for facilitating social networking service connections based on calendar data validated by a mobile device, according to some example embodiments. Operations in the method 500 may be performed using modules described above with respect to FIG. 4. As shown in FIG. 5, the method 500 may include one or more of operations 510, 520, 530, and 540.

At method operation 510, the calendar module 410 accesses (e.g., receives, obtains, etc.) calendar data that pertains to an electronic calendar of a first member of a social networking service. In some example embodiments, the accessing of the calendar data that pertains to the electronic calendar of the first member is performed at the first mobile device associated with the first member of the social networking service. In certain example embodiments, the accessing of the calendar data that pertains to the electronic calendar of the first member is performed at a server that is associated with the social networking service and that is in electronic communication with the first mobile device.

At method operation 520, the calendar module 410 identifies a scheduled event. The scheduled event may occur at a future time. The identifying of the scheduled event may be based on the calendar data of the first member of the social networking service. In some example embodiments, the identifying of the scheduled event is performed at the first mobile device associated with the first member of the social networking service. In certain example embodiments, the identifying of the scheduled event is performed at a server that is associated with the social networking service and that is in electronic communication with the first mobile device.

At method operation 530, the proximity module 420 determines that the first member and a second member of the social networking service attended the scheduled event. The determining may be based on a proximity between a first mobile device associated with the first member and a second mobile device associated with the second member. The proximity may be identified by the first mobile device.

At method operation 540, the member connecting module 430 generates a communication for the first member. The communication may include a prompt to connect with the second member via the social networking service. The generating of the communication may be based on the determining that the first member and the second member of the social networking service attended the scheduled event. Further details with respect to the method operations of the method 500 are described below with respect to FIGS. 6-15.

Figure 6:
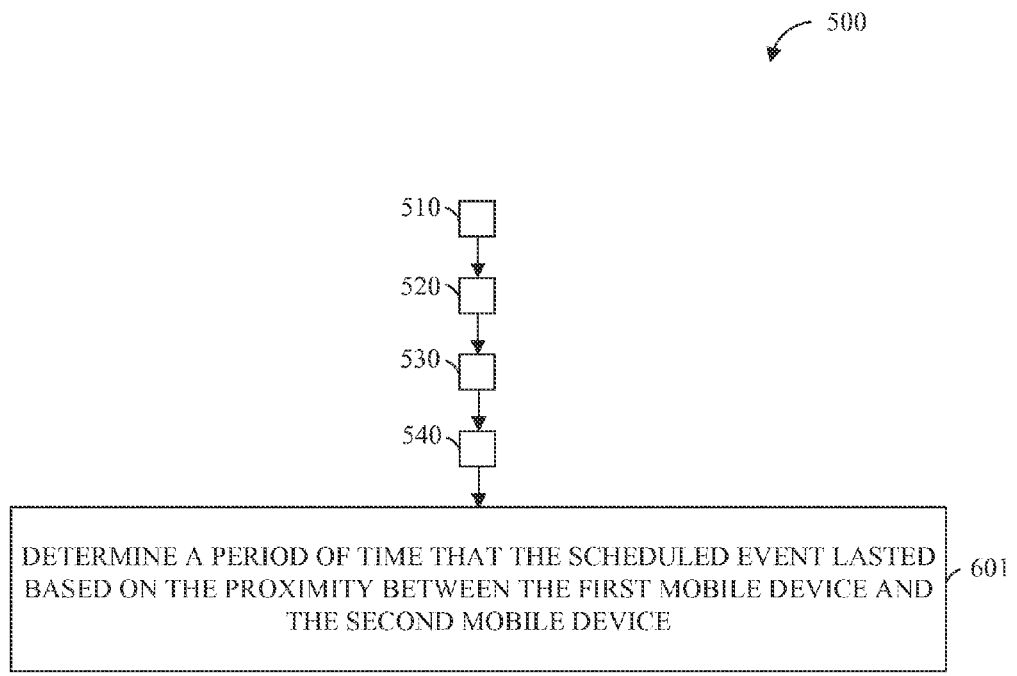
FIG. 6 is a flowchart that illustrates a method for facilitating social networking service connections based on calendar data validated by a mobile device and represents an additional step of the method illustrated in FIG. 5, according to some example embodiments.

As shown in FIG. 6, the method 500 may include method operation 601, according to some example embodiments. Method operation 601 may be performed before or after method operation 540, in which the member connecting module 430 generates a communication for the first member. At method operation 601, the proximity module 420 determines a period of time that the scheduled event lasted based on the proximity between the first mobile device and the second mobile device. For example, the proximity module 420 may identify a start time of the scheduled event based on the calendar data, the proximate location of (or a distance between) the first mobile device and the second mobile device, or both. The proximity module 420 may also identify an end time of the scheduled event based on the calendar data, a change in the proximate location of (or an increase in distance between) the first mobile device and the second mobile device, or both. The difference between the end time of the scheduled event and the start time of the scheduled time may identify the actual duration of the scheduled event.

Figure 7:
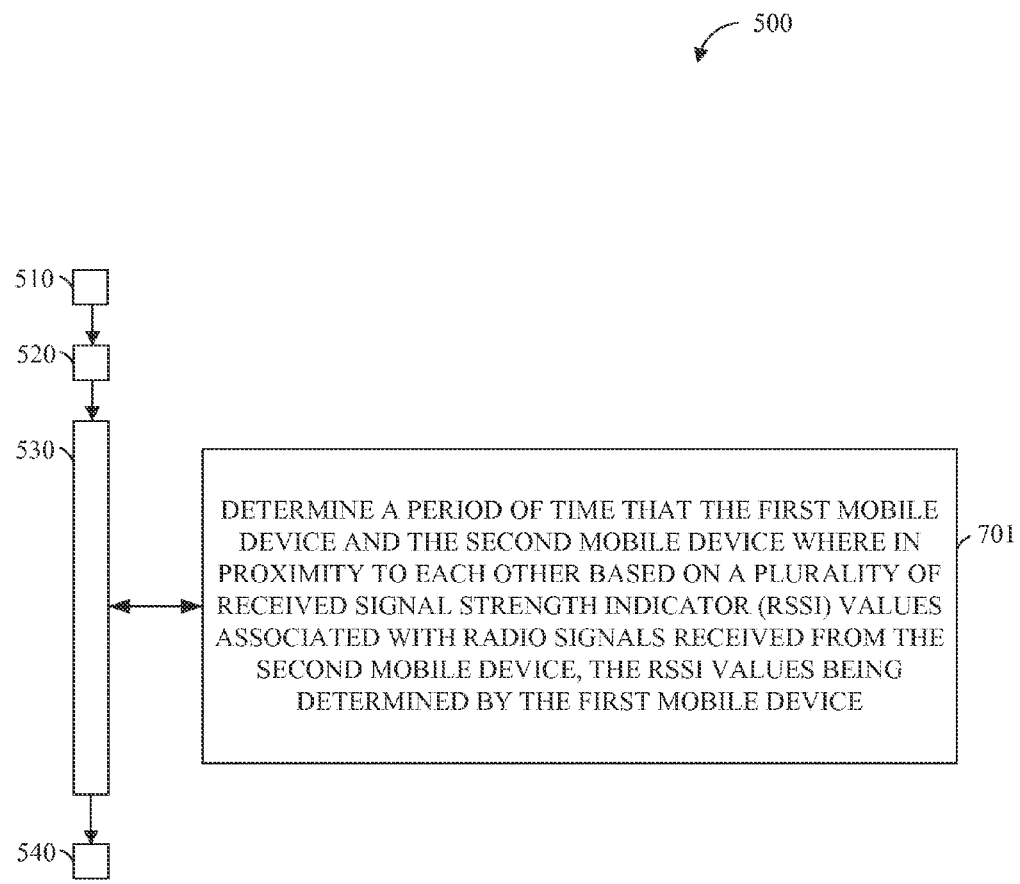
FIG. 7 is a flowchart that illustrates a method for facilitating social networking service connections based on calendar data validated by a mobile device and represents the step 530 of the method illustrated in FIG. 5 in more detail, according to some example embodiments.

As shown in FIG. 7, the method 500 may include method operation 701, according to some example embodiments. Method operation 701 may be performed as part (e.g., a precursor task, a subroutine, or a portion) of method operation 530, in which the proximity module 420 determines that the first member and the second member of the social networking service attended the scheduled event.

At method operation 701, the proximity module 420 determines a period of time that the first mobile device and the second mobile device where in proximity to each other based on a plurality of received signal strength indicator (RSSI) values associated with radio signals received from the second mobile device. The plurality of the RSSI values may be determined by the first mobile device.

Figure 8:
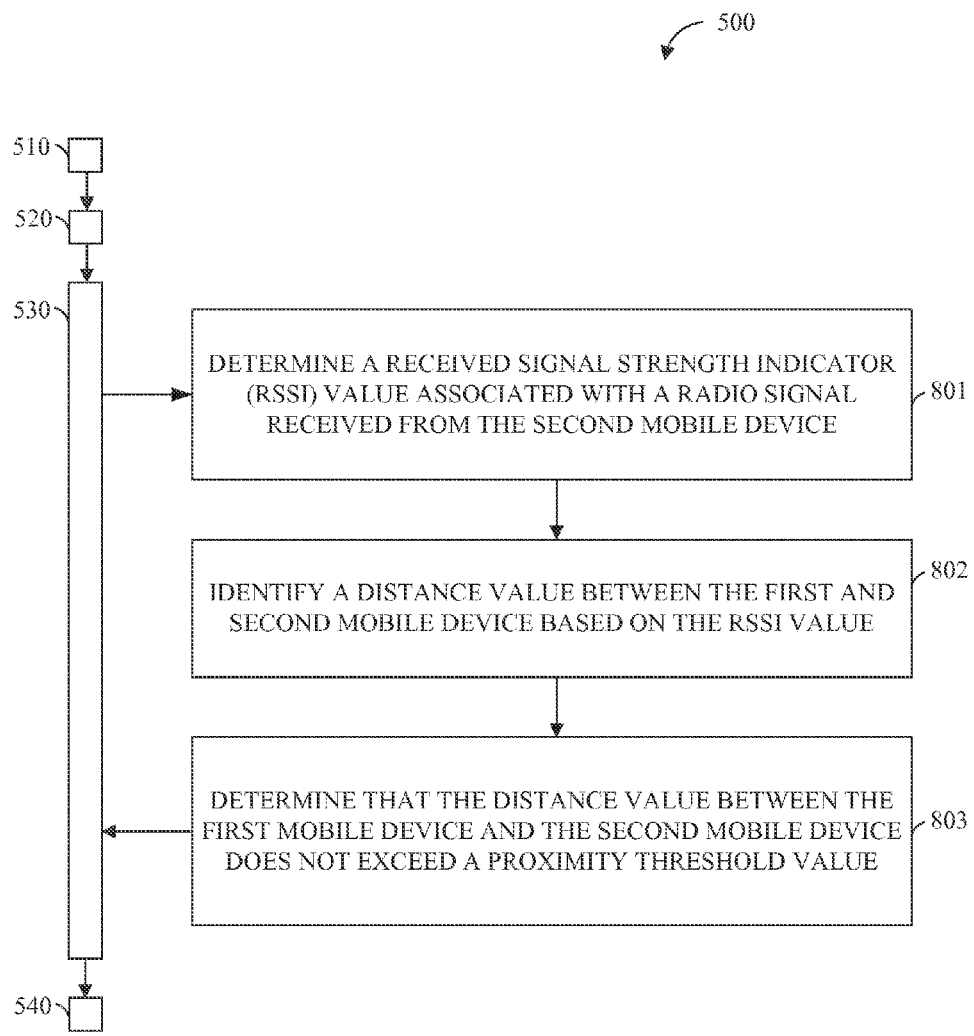
FIG. 8 is a flowchart that illustrates a method for facilitating social networking service connections based on calendar data validated by a mobile device and represents the step 530 of the method illustrated in FIG. 5 in more detail, according to some example embodiments.

As shown in FIG. 8, the method 500 may include one or more of method operations 801, 802, and 803, according to some example embodiments. Method operation 801 may be performed as part (e.g., a precursor task, a subroutine, or a portion) of method operation 530, in which the proximity module 420 determines that the first member and the second member of the social networking service attended the scheduled event. At method operation 801, the proximity module 420 determines (e.g., identifies, computes, measures, etc.) a received signal strength indicator (RSSI) value associated with a radio signal received from the second mobile device.

Method operation 802 may be performed after method operation 801. At method operation 802, the proximity module 420 identifies a distance value (e.g., immediate, near, far, etc.) between the first and second mobile device based on the RSSI value.

Method operation 803 may be performed after method operation 802. At method operation 803, the proximity module 420 determines that the distance value between the first mobile device and the second mobile device does not exceed a proximity threshold value.

Figure 9:
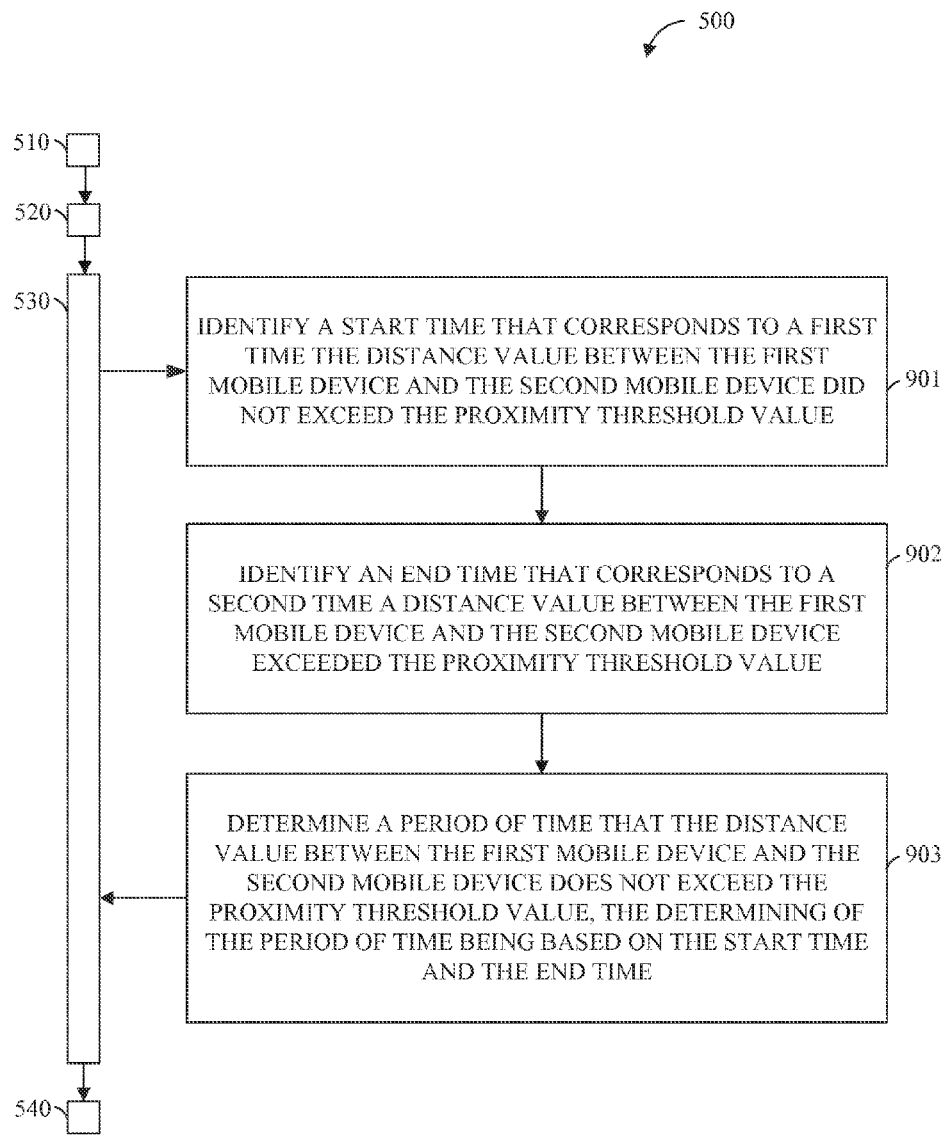
FIG. 9 is a flowchart that illustrates a method for facilitating social networking service connections based on calendar data validated by a mobile device and represents the step 530 of the method illustrated in FIG. 5 in more detail, according to some example embodiments.

As shown in FIG. 9, the method 500 may include one or more of method operations 901, 902, and 903, according to some example embodiments. Method operation 901 may be performed as part (e.g., a precursor task, a subroutine, or a portion) of method operation 530, in which the proximity module 420 determines that the first member and the second member of the social networking service attended the scheduled event. In some example embodiments, the method operation 901 is performed after method operation 803, in which the proximity module 420 determines that the distance value between the first mobile device and the second mobile device does not exceed a proximity threshold value.

At method operation 901, the proximity module 420 identifies a start time that corresponds to a first time that the distance value (e.g., a first distance value) between the first mobile device and the second mobile device did not exceed the proximity threshold value. In some instances, the start time may correspond to a time when the first mobile device and second mobile device are determined (e.g., by at least one of the first mobile device or the second mobile device) to come within a particular close distance to each other. For example, the proximity module 420 may determine that the second mobile device is located in close proximity to the first mobile device, and may identify the time when the distance value between the first and second mobile devices became less than a particular proximity threshold value.

In some example embodiments, the proximity module 420 may determine, based on location (e.g., Global Positioning System (GPS)) data pertaining to the first mobile device and/or the calendar data, the time when the first mobile device has arrived at the location of the scheduled event. If the location of the first mobile device is determined to be the same as the location of the scheduled event and the first distance value is determined to not exceed the proximity threshold value, the identified start time associated with the first distance value between the first mobile device and the second mobile device may indicate when the second member associated with the second mobile device has joined (e.g., has arrived at the location of) the scheduled event.

Method operation 902 may be performed after the method operation 901. At method operation 902, the proximity module 420 identifies an end time that corresponds to a second time that the distance value (e.g., a second distance value) between the first mobile device and the second mobile device exceeded the proximity threshold value. For example, the end time may correspond to a time when the distance value between the first mobile device and second mobile device is determined by the proximity module 420 to have become greater than the proximity threshold value such as when at least one of the first member or the second member has left location of the scheduled event.

In some example embodiments, the proximity module 420 may determine, based on GPS data pertaining to the first mobile device, the time when the first mobile device has left the location of the scheduled event. If the location of the first mobile device is determined to be the same as the location of the scheduled event but the second distance value is determined to have exceeded the proximity threshold value, the identified end time associated with the second distance value between the first mobile device and the second mobile device may indicate when the second member associated with the second mobile device has left the location of the scheduled event.

Method operation 903 may be performed after the method operation 902. At method operation 903, the proximity module 420 determines a period of time that the distance value between the first mobile device and the second mobile device does not exceed the proximity threshold value, the determining of the period of time being based on the start time and the end time. The period of time between the start time and the end time may indicate the time that the first mobile device and the second mobile device were located within a distance value from each other that did not exceed the proximity threshold value.

Figure 10:
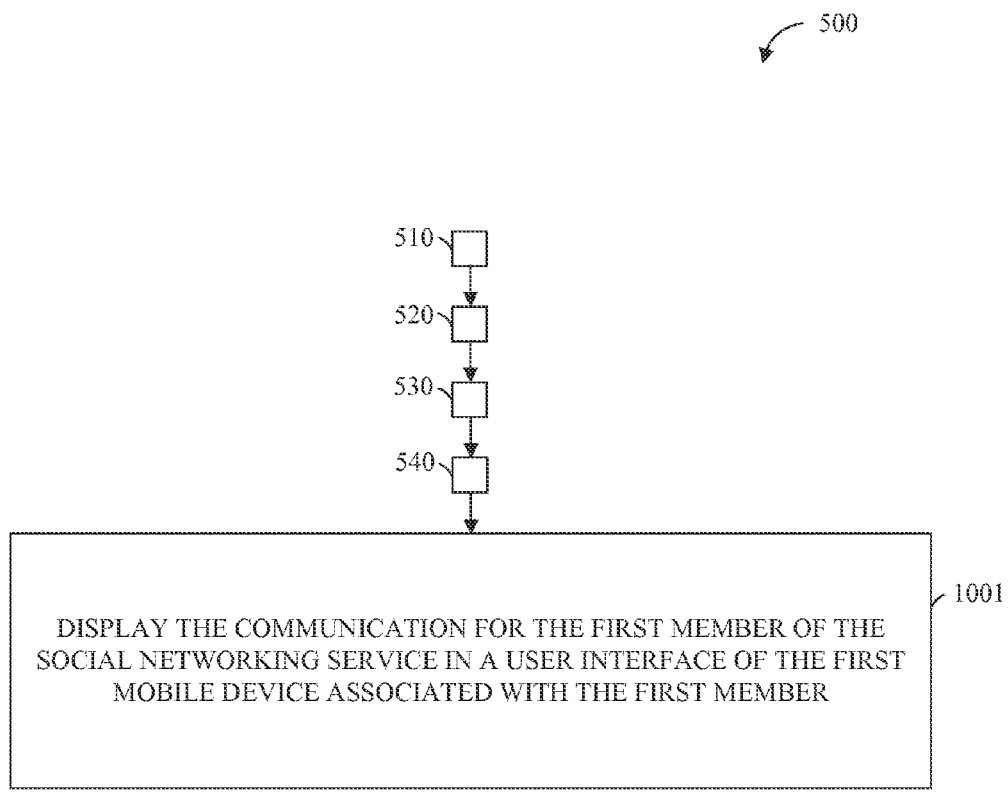
FIG. 10 is a flowchart that illustrates a method for facilitating social networking service connections based on calendar data validated by a mobile device and represents an additional step of the method illustrated in FIG. 5, according to some example embodiments.

As shown in FIG. 10, the method 500 may include method operation 1001, according to some example embodiments. Method operation 1001 may be performed after method operation 540, in which the member connecting module 430 generates a communication for the first member.

At method operation 1001, the user interface module 440 displays the communication for the first member of the social networking service in a user interface of the first mobile device associated with the first member. In certain example embodiments, the communication for the first member is presented to the first member by the user interface module 440 in audio form. In certain example embodiments, the communication is presented to the first member during the scheduled event or immediately after the scheduled event has ended. In other example embodiment, the communication is presented to the first member a period of time after the scheduled event has ended (e.g., the day after the scheduled event, a week after the scheduled event, etc.).

Figure 11:
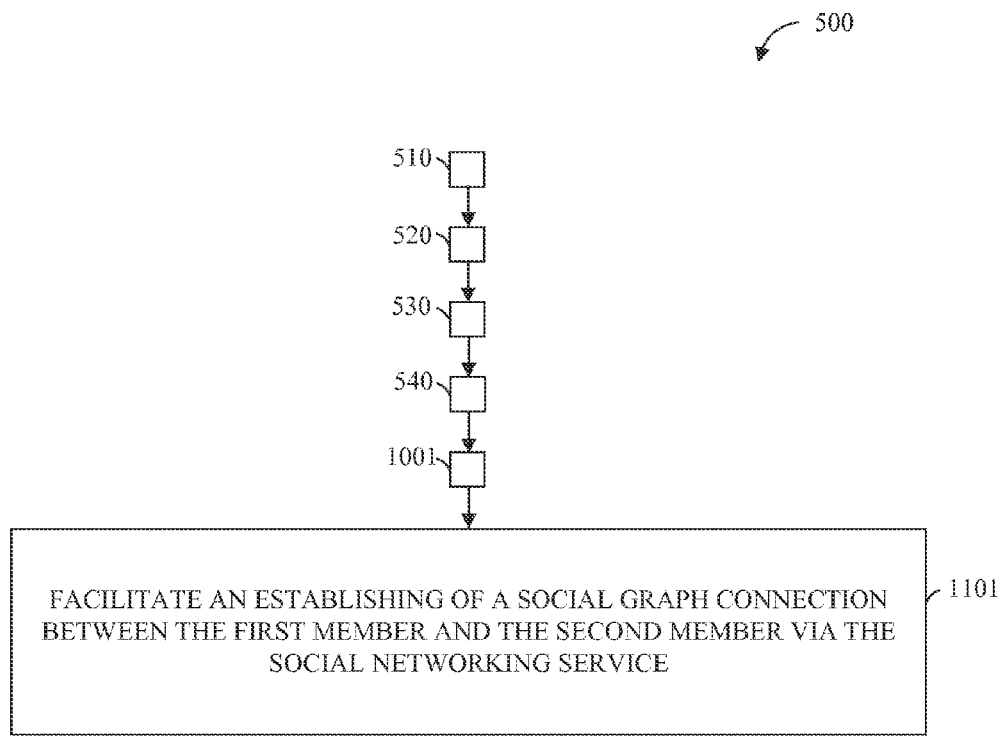
FIG. 11 is a flowchart that illustrates a method for facilitating social networking service connections based on calendar data validated by a mobile device and represents an additional step of the method illustrated in FIG. 5, according to some example embodiments.

As shown in FIG. 11, the method 500 may include method operation 1101, according to some example embodiments. Method operation 1101 may be performed after method operation 1001, in which the user interface module 440 displays the communication for the first member of the social networking service in the user interface of the first mobile device associated with the first member.

At method operation 1101, the member connecting module 430 facilitates an establishing of a social graph connection between the first member and the second member via the social networking service. In some example embodiments, before the member connecting module 430 facilitates the establishing of the social graph connection, the social networking module 460 determines that the second member is not a first-degree connection of the first member within the first social graph associated with the first member. The determining that the second member is not a first-degree connection of the first member may be based on the first social graph associated with the first member.

To facilitate the establishing of the social graph connection between the first member and the second member via the social networking service, the member connecting module 430 generates a message for the first member. The generating of the message for the first member may be based on the determining that the second member is not a first-degree connection of the first member. The message may pertain to establishing a connection between the first member and the second member via the social networking service. The user interface module 440 may present (e.g., display) the message for the first member via (e.g., in) a user interface of the first mobile device associated with the first member.

In some example embodiments, the user interface module 440 receives an input from the first member. The input, in some instances, may be received via a user interface of the first mobile device. The input may be audio, visual, textual, tactile, etc. The input may indicate a request to establish the connection between the first member and the second member via the social networking service. In some example embodiments, the input may be received from the first user in response to the presentation (e.g., displaying) of a prompt (e.g., a message) for the first member to connect with the second member via the social networking service.

The member connecting module 430, in response to receiving the input from the first member, may generate an invitation for the second member to connect with the first member via the social networking service. The mobile device communication module 450 may transmit a second communication to the second mobile device associated with the second member. The second communication may include the invitation for the second member to connect with the first member via the social networking service.

In response to the second communication transmitted to the second mobile device, the mobile device communication module 450 may receive a third communication from the second mobile device. The third communication may include an acceptance by the second member of the invitation for the second member to connect with the first member via the social networking service.

The member connecting module 430 may add a new edge between a first node representing the first member in the first social graph associated with the first member and a second node representing the second member in the first social graph associated with the first member. The adding of the new edge in the first social graph associated with the first member may be based on the acceptance by the second member of the invitation to connect with the first member via the social networking service. The new edge may indicate that the second member is a new connection (of the first member) in the first social graph associated with the first member.

Similarly, at the second mobile device, one or more modules associated with the second mobile device may add another new edge between a third node representing the second member in the second social graph associated with the second member and a fourth node representing the first member in the second social graph associated with the second member. The adding of the other new edge in the second social graph associated with the second member may be based on the acceptance by the second member of the invitation to connect with the first member via the social networking service. The other new edge may indicate that the first member is a new connection (of the second member) in the second social graph associated with the second member.

In some example embodiments, the new social graph connection between the first member and the second member is memorialized in one or more records of one or more databases 492. For example, data that pertains to the creation of a relationship between the first member and the second member via the social networking service is stored in one or more records as, for example, social graph data, member activity and behavior data, or profile data. The data that pertains to the creation of a relationship between the first member and the second member may include a variety of information such as when and where the first and second members met, whether the first and second members met at a scheduled event, the duration of their meeting or of the event, the type of information exchanged (e.g., electronic business cards, chat messages, presentations, etc.) by the first and second members using their mobile devices, whether information pertaining to (e.g., about) the other member was presented to a particular member before, during, or after the event, etc.

Figure 12:
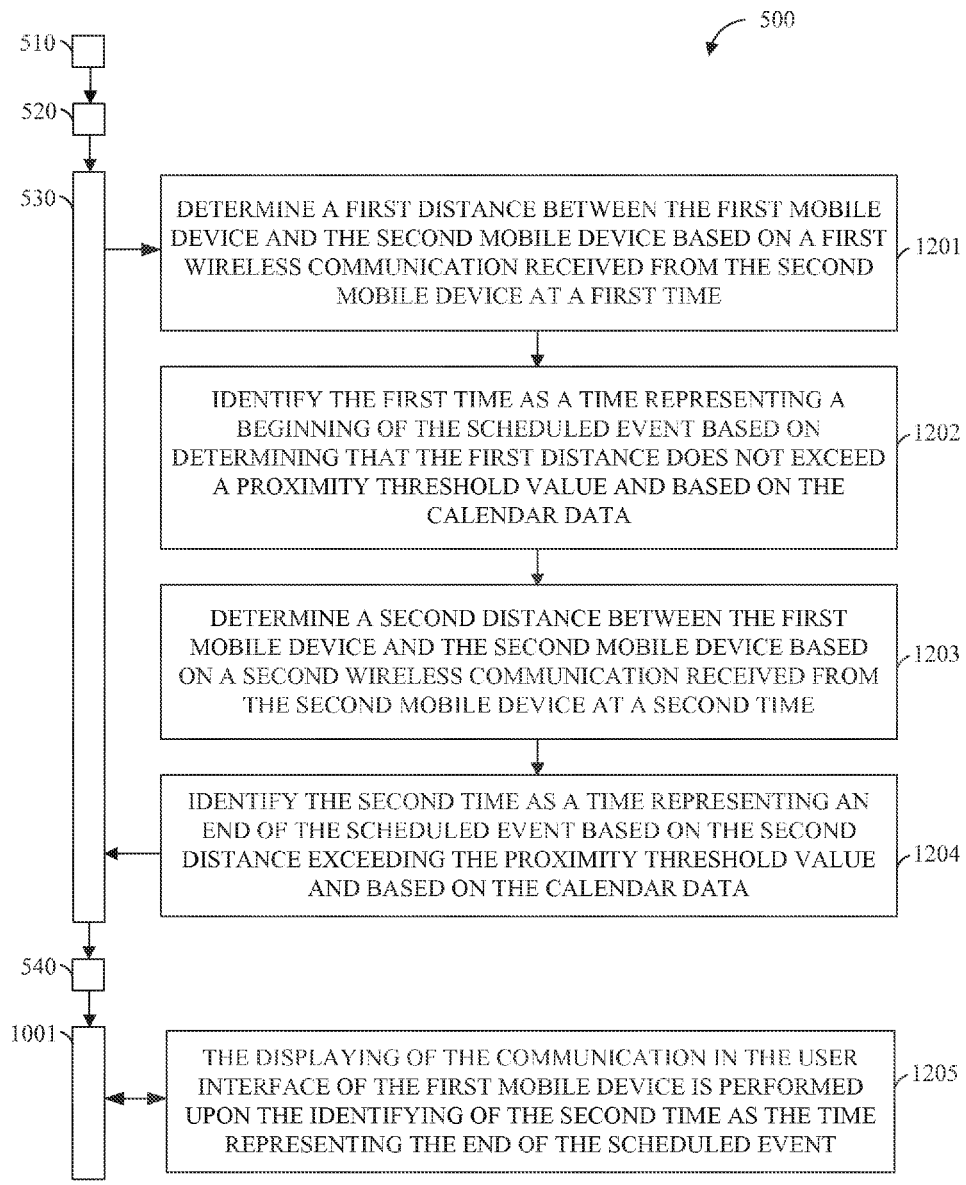
FIG. 12 is a flowchart that illustrates a method for facilitating social networking service connections based on calendar data validated by a mobile device and represents the steps 530 and 540 of the method illustrated in FIG. 5 in more detail, according to some example embodiments.

As shown in FIG. 12, the method 500 may include one or more of method operations 1201, 1202, 1203, 1204, and 1205, according to some example embodiments. Method operation 1201 may be performed as part (e.g., a precursor task, a subroutine, or a portion) of method operation 530, in which the proximity module 420 determines that the first member and the second member of the social networking service attended the scheduled event.

At method operation 1201, the proximity module 420 determines a first distance value between the first mobile device and the second mobile device based on a first wireless communication received from the second mobile device at a first time.

Method operation 1202 may be performed after method operation 1201. At method operation 1202, the proximity module 420 identifies the first time as a time representing a beginning of the scheduled event based on determining that the first distance value does not exceed a proximity threshold value and based on the calendar data.

Method operation 1203 may be performed after method operation 1202. At method operation 1203, the proximity module 420 determines a second distance value between the first mobile device and the second mobile device based on a second wireless communication received from the second mobile device at a second time.

Method operation 1204 may be performed after method operation 1203. At method operation 1204, the proximity module 420 identifies the second time as a time representing an end of the scheduled event based on the second distance value exceeding the proximity threshold value and based on the calendar data.

Method operation 1205 may be performed as part (e.g., a precursor task, a subroutine, or a portion) of method operation 1001, in which the user interface module 440 displays the communication for the first member of the social networking service in the user interface of the first mobile device associated with the first member. At method operation 1205, the user interface module 440 displays the communication for the first member of the social networking service in the user interface of the first mobile device based on (e.g., upon) the identifying of the second time as the time representing the end of the scheduled event.

Figure 13:
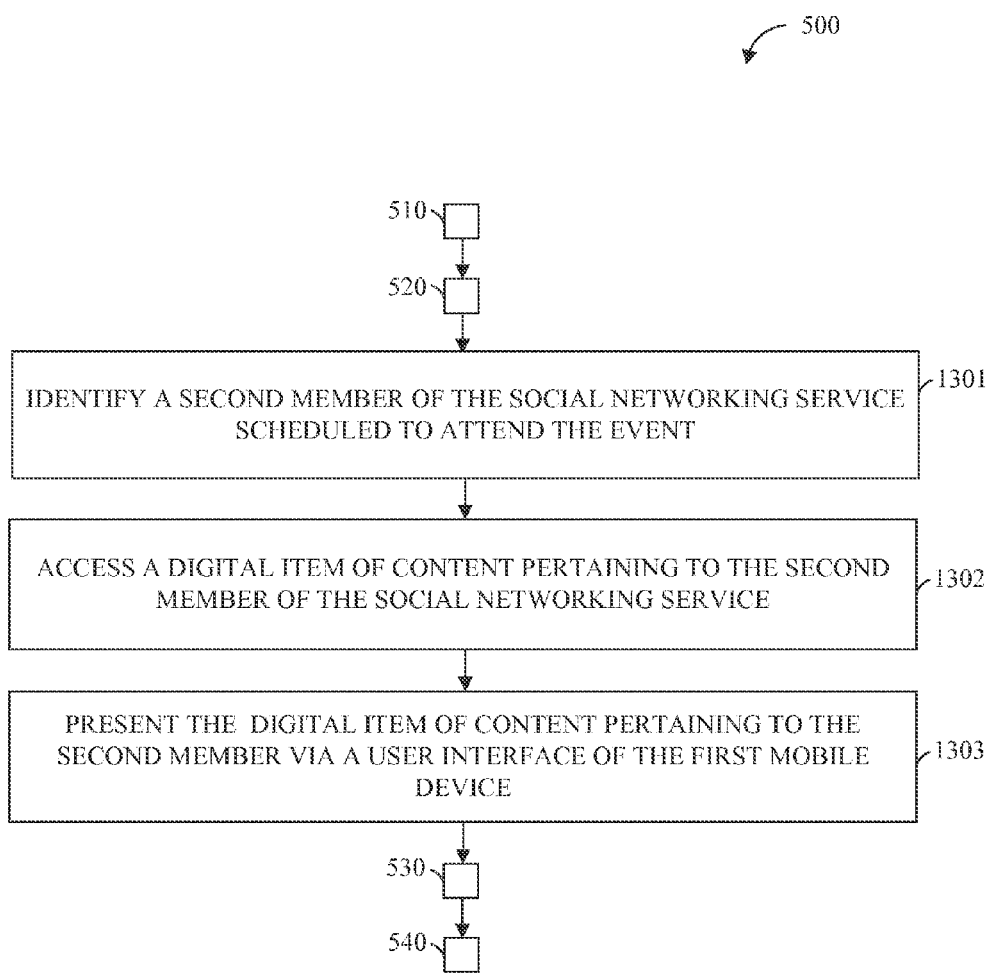
FIG. 13 is a flowchart that illustrates a method for facilitating social networking service connections based on calendar data validated by a mobile device and represents additional steps of the method illustrated in FIG. 5, according to some example embodiments.

As shown in FIG. 13, the method 500 may include one or more of method operations 1301, 1302, and 1303, according to some example embodiments. Method operation 1301 may be performed after method operation 520, in which the calendar module 410 identifies a scheduled event. At method operation 1301, the calendar module 410 identifies the second member of the social networking service scheduled to attend the event.

In some example embodiments, the identifying of the second member of the social networking service scheduled to attend the event is based on the calendar data that pertains to the electronic calendar of the first member. In various example embodiments, the identifying of the second member is based on an electronic communication broadcast by the second mobile device associated with the second member to a local area where the first mobile device is located. The electronic communication broadcast by the second mobile device may be received at the first mobile device and may serve as basis for identifying the second member of the social networking service. For example, an identifier of the second member of the social networking service included in the electronic communication may be used to identify the second member.

Furthermore, the identifier of the second member may be used to determine that the second member is scheduled to attend the scheduled event. In some example embodiments, the first and second mobile devices may establish an ad hoc wireless peer-to-peer network, and may transmit and receive data (e.g., calendar data that pertains to one or more members of the social networking service) to and from the first and second mobile devices. In some instances, the calendar module 410 identifies the second member of the social networking service scheduled to attend the event based on the calendar data that pertains to the electronic calendar of the second member.

Method operation 1302 may be performed after method operation 1301. At method operation 1302, the user interface module 440 accesses a digital item of content pertaining to the second member of the social networking service.

In some example embodiments, the digital item of content pertaining to the second member is received (e.g., obtained, accessed, etc.) by the mobile device communication module 450 from the second mobile device via the ad hoc wireless peer-to-peer network established by the first mobile device and the second mobile device. Such an ad hoc wireless peer-to-peer network may be established by the first mobile device and the second mobile device during the scheduled event attended by the first member and the second member.

In certain example embodiments, the digital item of content pertaining to the second member is received (e.g., obtained, accessed, etc.) by the server communication module 480 from a server associated with the social networking system 220 (e.g., a server of the interaction support system 226). In some instances, the server selects the item of content that pertains to the second member based on a request for the digital item of content received from the first mobile device. In some example embodiments, the selecting of the item of content that pertains to the second member includes accessing a calendar of the second member, identifying a present context pertaining to the second member based on the calendar of the second member, identifying data relevant to the present context pertaining to the second member, and generating an item of content based on the data relevant to the present context pertaining to the second member.

Method operation 1303 may be performed after method operation 1302. At method operation 1303, the user interface module 440 presents the digital item of content pertaining to the second member via the user interface of the first mobile device.

Figure 14:
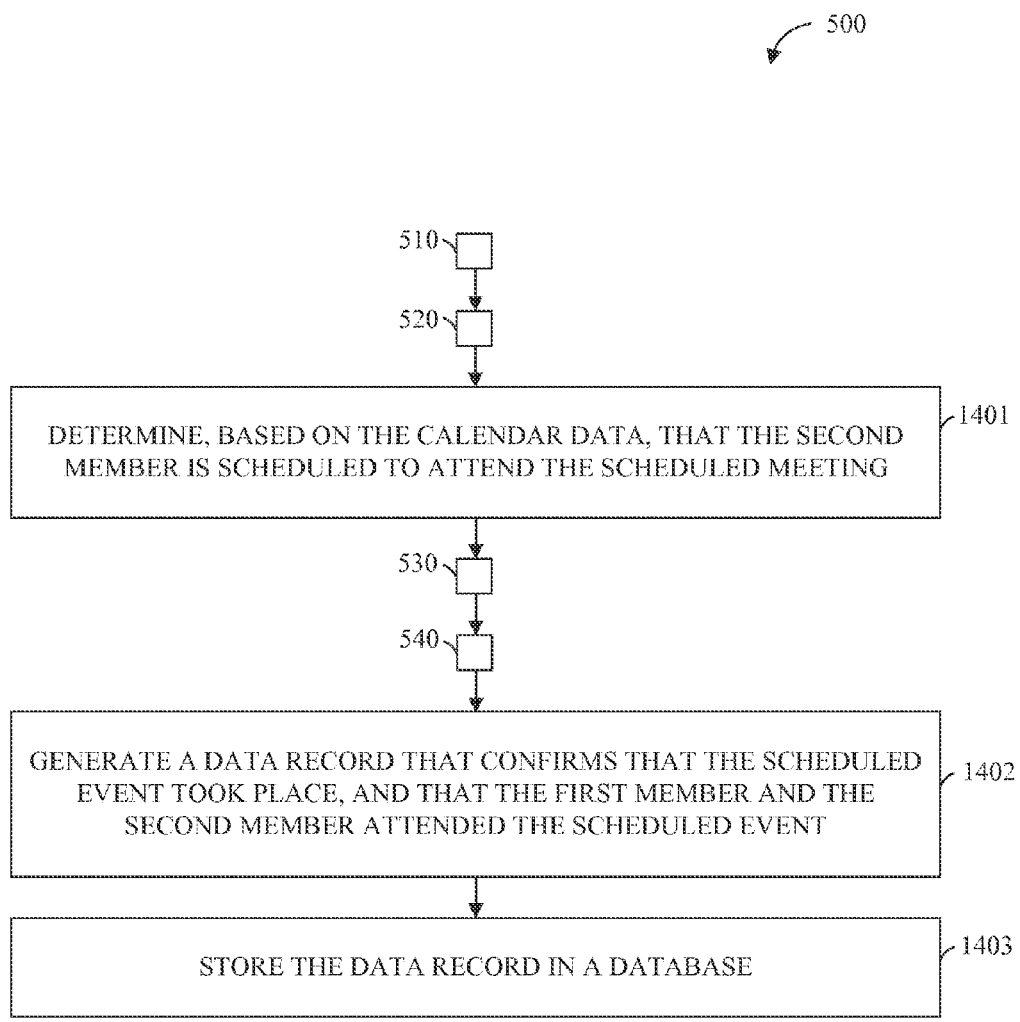
FIG. 14 is a flowchart that illustrates a method for facilitating social networking service connections based on calendar data validated by a mobile device and represents additional steps of the method illustrated in FIG. 5, according to some example embodiments.

As shown in FIG. 14, the method 500 may include one or more of method operations 1401, 1402, and 1403, according to some example embodiments. Method operation 1401 may be performed after method operation 520, in which the calendar module 410 identifies a scheduled event. At method operation 1401, the calendar module 410 determines that the second member is scheduled to attend the scheduled event. The determining that the second member is scheduled to attend the scheduled event may be based on the calendar data.

Method operation 1402 may be performed after method operation 540, in which the member connecting module 430 generates a communication for the first member. The communication may include a prompt to connect with the second member via the social networking service. At method operation 1402, the calendar module 410 generates a data record that confirms that the scheduled event took place, and that the first member and the second member attended the scheduled event.

Method operation 1403 may be performed after method operation 1402. At method operation 1403, the calendar module 410 stores the data record in a database (e.g., the database 492) associated with the first mobile device.

Figure 15:
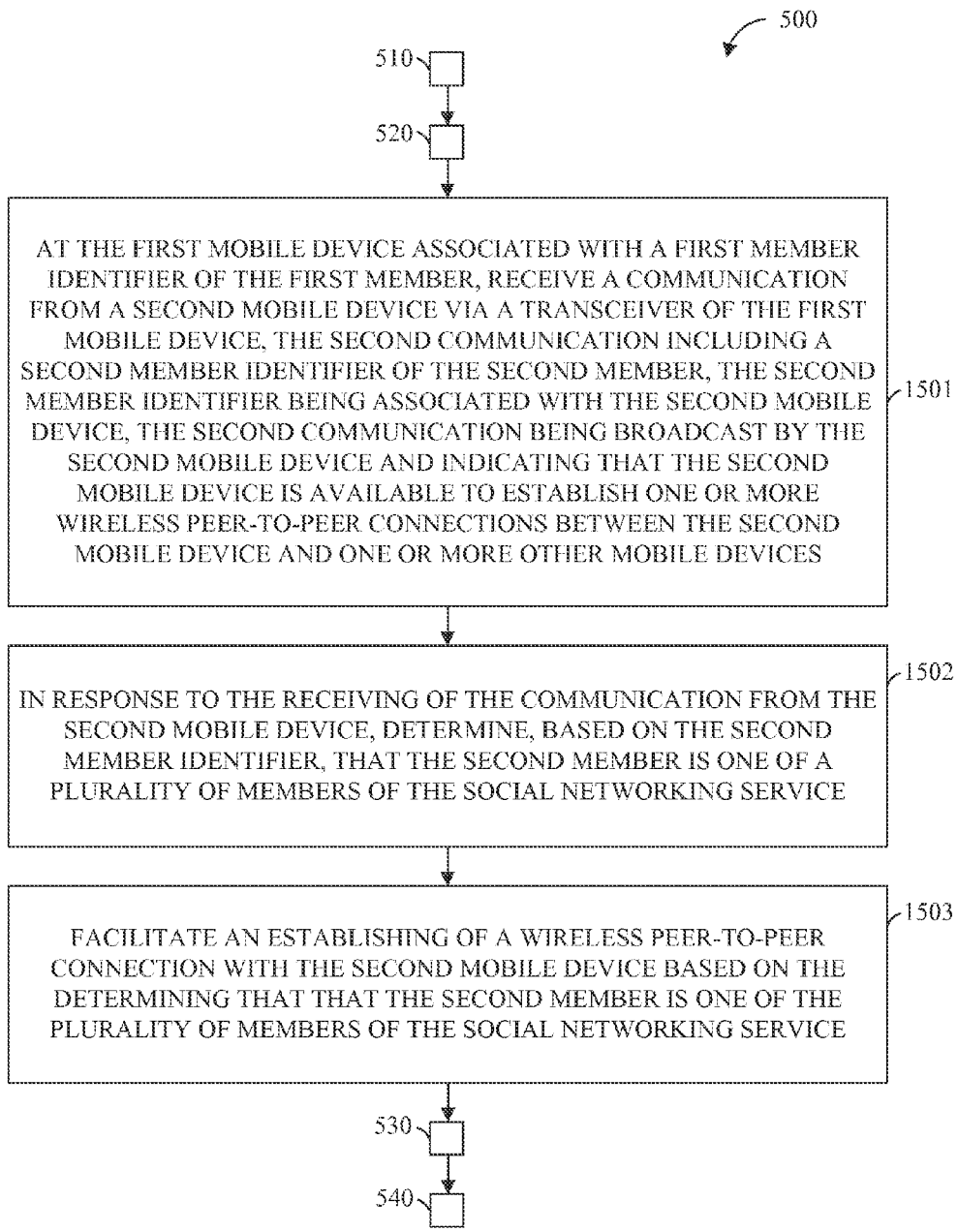
FIG. 15 is a flowchart that illustrates a method for facilitating social networking service connections based on calendar data validated by a mobile device and represents additional steps of the method illustrated in FIG. 5, according to some example embodiments.

As shown in FIG. 15, the method 500 may include one or more of method operations 1501, 1502, and 1503, according to some example embodiments. In some example embodiments, the communication for the first member is a first communication. Method operation 1501 may be performed after method operation 520, in which the calendar module 410 identifies a scheduled event. At method operation 1501, the mobile device communication module 450 receives a second communication from a second mobile device via a transceiver of the first mobile device. The second communication may include a second member identifier of the second member. The second member identifier may be associated with the second mobile device. The second communication may be broadcast by the second mobile device and may indicate that the second mobile device is available to establish one or more wireless peer-to-peer connections between the second mobile device and one or more other mobile devices.

Method operation 1502 may be performed after method operation 1501. At method operation 1502, the social networking module 460, in response to the receiving of the second communication, determines that the second member is one of a plurality of members of the social networking service. The determining that the second member is one of the plurality of members of the social networking service may be based on the second member identifier.

Method operation 1503 may be performed after method operation 1502. At method operation 1503, the mobile device connecting module 470 facilitates an establishing of a wireless peer-to-peer connection with the second mobile device. The facilitating of the wireless peer-to-peer connection with the second mobile device may be based on the determining that that the second member is one of the plurality of members of the social networking service. In some example embodiments, the facilitating of the establishing of the wireless peer-to-peer connection is further based on the proximity between the first mobile device and the second mobile device.

In some example embodiments, the user interface module 440 displays, in a user interface of the first mobile device, one or more member identifiers to indicate one or more established wireless peer-to-peer connections between the first mobile device and other mobile devices. The one or more established wireless peer-to-peer connections may include the wireless peer-to-peer connection with the second mobile device. The displaying of the second member identifier may represent the wireless peer-to-peer connection with the second mobile device.

In various example embodiments, the social networking module 460 determines, based on the second member identifier, that the second member is not a first-degree connection of the first member within the social graph associated with the first member. The social networking module 460 may also determine that a third member identifier associated with a third member of the social networking service and referenced in a third communication received from a third mobile device is a first-degree connection of the first member within the social graph associated with the first member. The user interface module 440 may indicate, in the user interface of the first mobile device, that the second member of the social networking service is not a first-degree connection within the social graph associated with the first member. The user interface module 440 may also indicate, in the user interface of the first mobile device, that the third member of the social networking service is a first-degree connection within the social graph associated with the first member.

Consistent with various example embodiments, the mobile device communication module 450 receives a third communication from a third mobile device via the transceiver of the first mobile device. The third communication may include a third member identifier of a third member of the social networking service. The third member identifier may be associated with the third mobile device. The third communication may be broadcast by the third mobile device and may indicate that the third mobile device is available to establish one or more wireless peer-to-peer connections between the third mobile device and one or more other mobile devices.

In response to the receiving of the third communication, the social networking module 460 may determine, based on the third member identifier, that the third member is one of the plurality of members of the social networking service. The mobile device connecting module 470 may, in some instances, facilitate the third mobile device joining the wireless peer-to-peer connection established between the first and second mobile devices based on the determining that that the third member is one of the plurality of members of the social networking service. In other instances, the mobile device connecting module 470 may facilitate an establishing of a further wireless peer-to-peer connection with the third mobile device based on the determining that that the third member is one of the plurality of members of the social networking service.

In some example embodiments, the user interface module 440 displays a number of member identifiers including the second member identifier and the third member identifier in a user interface of the first mobile device. The second member identifier and the third member identifier may identify the second mobile device and the third mobile device as being wirelessly connected to the first mobile device via one or more wireless peer-to-peer connections. The mobile device connecting module 470 may determine that the second mobile device has interrupted the wireless peer-to-peer connection with the first mobile device. The user interface module 440 may update the member identifiers displayed in the user interface of the first mobile device based on the determining that the second mobile device has interrupted the wireless peer-to-peer connection with the first mobile device.

Example Mobile Device

Figure 16:
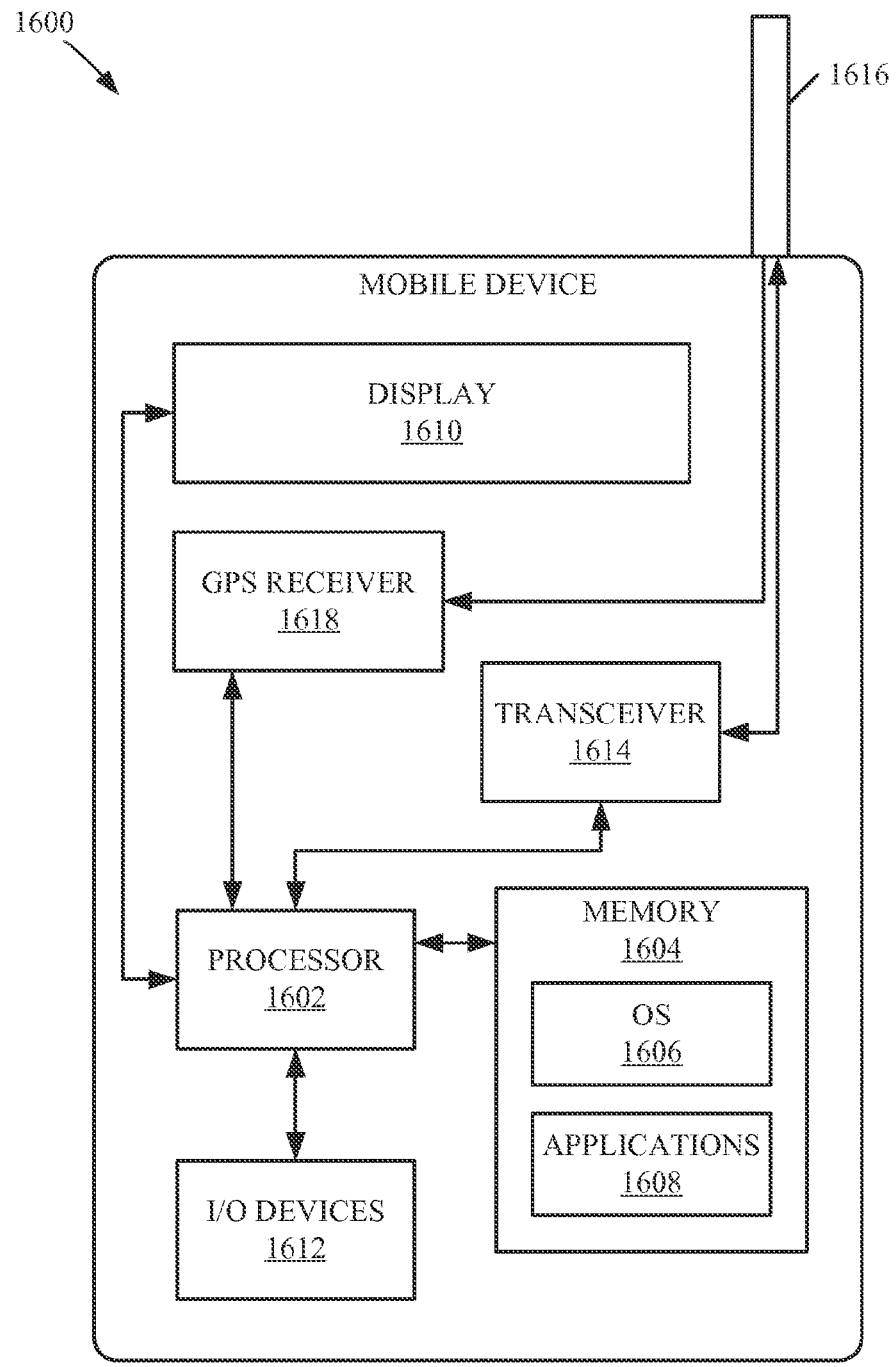
FIG. 16 is a block diagram illustrating a mobile device, according to some example embodiments.

FIG. 16 is a block diagram illustrating a mobile device 1600, according to an example embodiment. The mobile device 1600 may include a processor 1602. The processor

1602 may be any of a variety of different types of commercially available processors 1602 suitable for mobile devices 1600 (for example, an XScale architecture microprocessor, a microprocessor without interlocked pipeline stages (MIPS) architecture processor, or another type of processor 1602). A memory 1604, such as a random access memory (RAM), a flash memory, or other type of memory, is typically accessible to the processor 1602. The memory 1604 may be adapted to store an operating system (OS) 1606, as well as application programs 1608, such as a mobile location enabled application that may provide LBSs to a user. The processor 1602 may be coupled, either directly or via appropriate intermediary hardware, to a display 1610 and to one or more input/output (I/O) devices 1612, such as a keypad, a touch panel sensor, a microphone, and the like. Similarly, in some embodiments, the processor 1602 may be coupled to a transceiver 1614 that interfaces with an antenna 1616. The transceiver 1614 may be configured to both transmit and receive cellular network signals, wireless data signals, or other types of signals via the antenna 1616, depending on the nature of the mobile device 1600. Further, in some configurations, a GPS receiver 1618 may also make use of the antenna 1616 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some example embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 17:
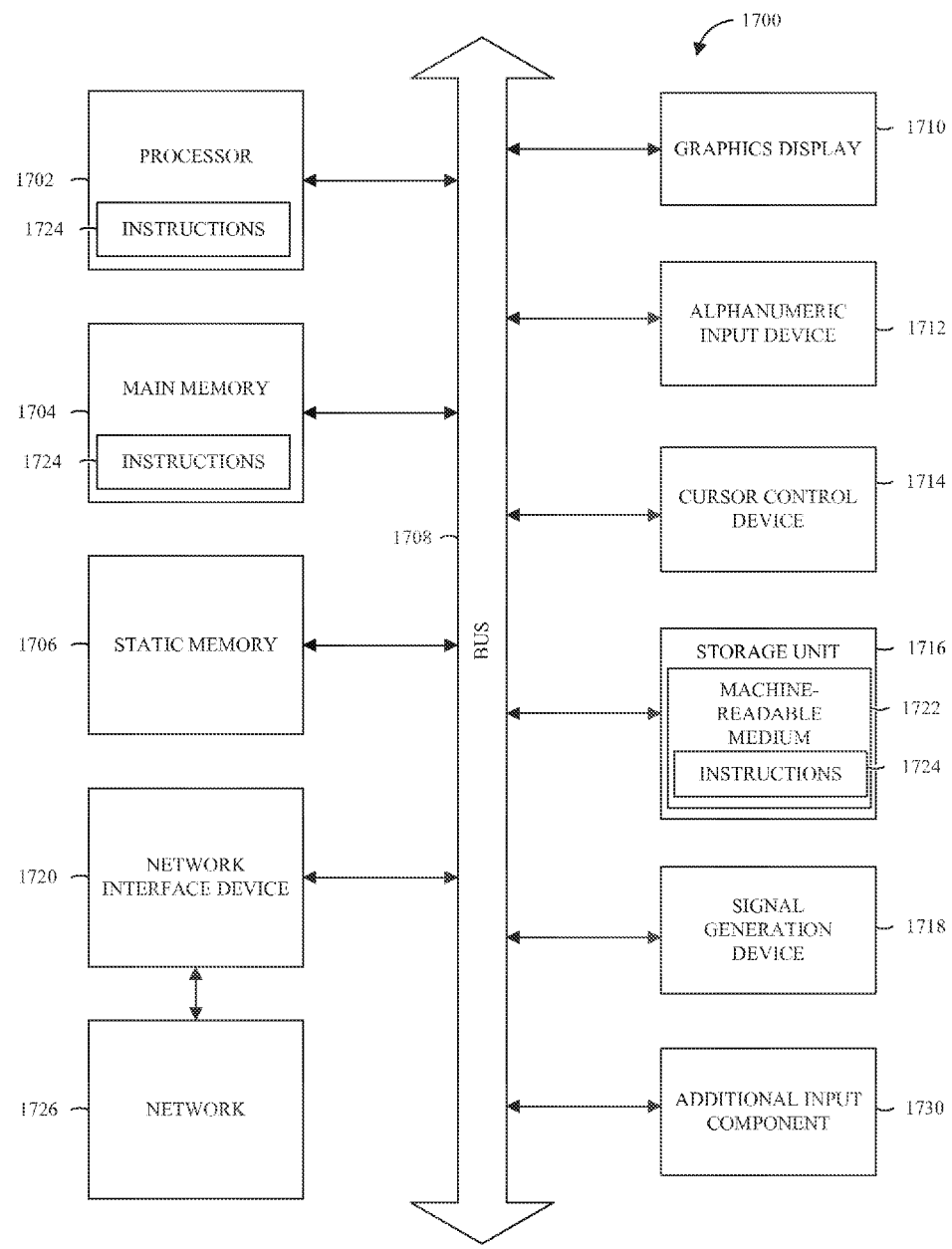
FIG. 17 is a block diagram illustrating components of a machine, according to some example embodiments, able to read instructions from a machine-readable medium and perform any one or more of the methodologies discussed herein.

FIG. 17 is a block diagram illustrating components of a machine 1700, according to some example embodiments, able to read instructions 1724 from a machine-readable medium 1722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 17 shows the machine 1700 in the example form of a computer system (e.g., a computer) within which the instructions 1724 (e.g., software, a program, an application, an applet, an app, or other executable code) for causing the machine 1700 to perform any one or more of the methodologies discussed herein may be executed, in whole or in part.

In alternative embodiments, the machine 1700 operates as a standalone device or may be connected (e.g., networked) to other machines. In a networked deployment, the machine 1700 may operate in the capacity of a server machine or a client machine in a server-client network environment, or as a peer machine in a distributed (e.g., peer-to-peer) network environment. The machine 1700 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1724, sequentially or otherwise, that specify actions to be taken by that machine. Further, while only a single machine is illustrated, the term "machine" shall also be taken to include any collection of machines that individually or jointly execute the instructions 1724 to perform all or part of any one or more of the methodologies discussed herein.

The machine 1700 includes a processor 1702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1704, and a static memory 1706, which are configured to communicate with each other via a bus 1708. The processor 1702 may contain microcircuits that are configurable, temporarily or permanently, by some or all of the instructions 1724 such that the processor 1702 is configurable to perform any one or more of the methodologies described herein, in whole or in part. For example, a set of one or more microcircuits of the processor 1702 may be configurable to execute one or more modules (e.g., software modules) described herein.

The machine 1700 may further include a graphics display 1710 (e.g., a plasma display panel (PDP), a light emitting diode (LED) display, a liquid crystal display (LCD), a projector, a cathode ray tube (CRT), or any other display capable of displaying graphics or video). The machine 1700 may also include an alphanumeric input device 1712 (e.g., a keyboard or keypad), a cursor control device 1714 (e.g., a mouse, a touchpad, a trackball, a joystick, a motion sensor, an eye tracking device, or other pointing instrument), a storage unit 1716, an audio generation device 1718 (e.g., a sound card, an amplifier, a speaker, a headphone jack, or any suitable combination thereof), and a network interface device 1720.

The storage unit 1716 includes the machine-readable medium 1722 (e.g., a tangible and non-transitory machine-readable storage medium) on which are stored the instructions 1724 embodying any one or more of the methodologies or functions described herein. The instructions 1724 may also reside, completely or at least partially, within the main memory 1704, within the processor 1702 (e.g., within the processor's cache memory), or both, before or during execution thereof by the machine 1700. Accordingly, the main memory 1704 and the processor 1702 may be considered machine-readable media (e.g., tangible and non-transitory machine-readable media). The instructions 1724 may be transmitted or received over the network 1726 via the network interface device 1720. For example, the network interface device 1720 may communicate the instructions 1724 using any one or more transfer protocols (e.g., hypertext transfer protocol (HTTP)).

In some example embodiments, the machine 1700 may be a portable computing device, such as a smart phone or tablet computer, and have one or more additional input components 1730 (e.g., sensors or gauges). Examples of such input components 1730 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1724 for execution by the machine 1700, such that the instructions 1724, when executed by one or more processors of the machine 1700 (e.g., processor 1702), cause the machine 1700 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   accessing, at a record of a database, calendar data that pertains to an electronic calendar of a first member of a social networking service (SNS);
   identifying a scheduled event based on the calendar data of the first member of the SNS;
   at a first mobile device associated with the first member of the SNS, determining, by one or more hardware processors, that the first member and a second member of the SNS attended the scheduled event based on an automatically-determined proximity of a second mobile device associated with the second member to the first mobile device associated with the first member, the proximity of the second mobile device being automatically determined by the first mobile device using low energy proximity sensing technology on the first mobile device;
   at the first mobile device, generating a first communication for the first member, the first communication including a prompt to connect with the second member via the SNS, the generating of the first communication being in response to the determining that the first member and the second member attended the scheduled event, the prompt referencing the scheduled event attended by both the first member and the second member; and
   causing display of a user interface of the first mobile device based on the generating, at the first mobile device, of the first communication including the prompt to connect the first member and the second member via the SNS, the user interface of the first mobile device displaying the first communication including the prompt in the user interface of the first mobile device, the user interface of the first mobile device further displaying a user interface element for replying to the prompt, a selection of the user interface element resulting in a second communication including an invitation to connect via the SNS being automatically generated and transmitted to the second mobile device, the generation of the first communication and the causing display of the user interface of the first mobile device improving a computer system associated with the first mobile device based on obviating one or more requests, received at the first mobile device, pertaining to the scheduled event referenced in the prompt included in the first communication displayed in the user interface of the first mobile device.

2. The method of claim 1, wherein the accessing of the calendar data that pertains to the electronic calendar of the first member and the identifying of the scheduled event are performed at the first mobile device associated with the first member of the SNS.

3. The method of claim 1, wherein the accessing of the calendar data that pertains to the electronic calendar of the first member and the identifying of the scheduled event are performed at a server that is associated with the SNS and that is in electronic communication with the first mobile device.

4. The method of claim 1, further comprising:
   determining a period of time that the scheduled event lasted based on the proximity of the second mobile device associated with the second member to the first mobile device.

5. The method of claim 1, wherein the determining that member and a second member of the SNS attended the scheduled event includes:
   determining a period of time that the first mobile device and the second mobile device where in proximity to each other based on a plurality of received signal strength indicator (RSSI) values associated with radio signals received from the second mobile device, the plurality of the RSSI values being determined by the first mobile device.

6. The method of claim 1, wherein the determining that the first member and the second member attended the scheduled event includes:
   determining a received signal strength indicator (RSSI) value associated with a radio signal received from the second mobile device;
   identifying a distance value between the first and second mobile device based on the RSSI value;
   determining that the distance value between the first mobile device and the second mobile device does not exceed a proximity threshold value.

7. The method of claim 6, wherein the determining that the first member and the second member attended the scheduled event includes:
   identifying a start time that corresponds to a first time the distance value between the first mobile device and the second mobile device did not exceed the proximity threshold value;
   identifying an end time that corresponds to a second time the distance value between the first mobile device and the second mobile device exceeded the proximity threshold value; and
   determining a period of time that the distance value between the first mobile device and the second mobile device does not exceed the proximity threshold value, the determining of the period of time being based on the start time and the end time.

8. The method of claim 1, further comprising displaying the communication for the first member of the SNS in a user interface of the first mobile device associated with the first member.

9. The method of claim 8, further comprising facilitating an establishing of a social graph connection between the first member and the second member via the SNS.

10. The method of claim 8, wherein the determining that the first member and a second member of the SNS attended the scheduled event includes:

determining a first distance value between the first mobile device and the second mobile device based on a first wireless communication received from the second mobile device at a first time;

identifying the first time as a time representing a beginning of the scheduled event based on determining that the first distance value does not exceed a proximity threshold value and based on the calendar data;

determining a second distance value between the first mobile device and the second mobile device based on a second wireless communication received from the second mobile device at a second time;

identifying the second time as a time representing an end of the scheduled event based on the second distance value exceeding the proximity threshold value and based on the calendar data, and wherein the displaying of the communication for the first member of the SNS in the user interface of the first mobile device is performed based on the identifying of the second time as the time representing the end of the scheduled event.

11. The method of claim 1, further comprising identifying a second member of the SNS scheduled to attend the event.

12. The method of claim 11, wherein the identifying of the second member of the SNS scheduled to attend the event is based on the calendar data that pertains to the electronic calendar of the first member.

13. The method of claim 11, further comprising:
accessing a digital item of content pertaining to the second member of the SNS; and
presenting the digital item of content pertaining to the second member via a user interface of the first mobile device.

14. The method of claim 1, further comprising:
determining, based on the calendar data, that the second member is scheduled to attend the scheduled event;
generating a data record that confirms that the scheduled event took place, and that the first member and the second member attended the scheduled event; and
storing the data record in a database associated with the first mobile device.

15. The method of claim 1, wherein the communication for the first member is a first communication, and further comprising:
at the first mobile device associated with a first member identifier of the first member, receiving a second communication from a second mobile device via a transceiver of the first mobile device, the second communication including a second member identifier of the second member, the second member identifier being associated with the second mobile device, the second communication being broadcast by the second mobile device and indicating that the second mobile device is available to establish one or more wireless peer-to-peer connections between the second mobile device and one or more other mobile devices;
in response to the receiving of the second communication, determining, based on the second member identifier, that the second member is one of a plurality of members of the SNS; and
facilitating an establishing of a wireless peer-to-peer connection with the second mobile device based on the determining that the second member is one of the plurality of members of the SNS.

16. The method of claim 15, wherein the facilitating of the establishing of the wireless peer-to-peer connection is further based on the proximity of the second mobile device associated with the second member to the first mobile device.

17. A system comprising:
one or more hardware processors; and
a non-transitory machine-readable medium for storing instructions that, when executed by the one or more hardware processors, cause the one or more hardware processors to perform operations comprising:
accessing, at a record of a database, calendar data that pertains to an electronic calendar of a first member of a social networking service (SNS);
identifying a scheduled event based on the calendar data of the first member of the SNS;
at a first mobile device associated with the first member of the SNS, determining that the first member and a second member of the SNS attended the scheduled event based on an automatically-determined proximity of a second mobile device associated with the second member to the first mobile device associated with the first member, the proximity of the second mobile device being automatically determined by the first mobile device using low energy proximity sensing technology on the first mobile device;
at the first mobile device, generating a first communication for the first member, the first communication including a prompt to connect with the second member via the SNS, the generating of the first communication being in response to the determining that the first member and the second member attended the scheduled event, the prompt referencing the scheduled event attended by both the first member and the second member; and
causing display of a user interface of the first mobile device based on the generating, at the first mobile device, of the first communication including the prompt to connect the first member and the second member via the SNS, the user interface of the first mobile device displaying the first communication including the prompt in the user interface of the first mobile device, the user interface of the first mobile device further displaying a user interface element for replying to the prompt, a selection of the user interface element resulting in a second communication including an invitation to connect via the SNS being automatically generated and transmitted to the second mobile device, the generation of the first communication and the causing display of the user interface of the first mobile device improving a computer system associated with the first mobile device based on obviating one or more requests, received at the first mobile device, pertaining to the scheduled event referenced in the prompt included in the first communication displayed in the user interface of the first mobile device.

18. The system of claim 17, wherein the operations further comprise:
determining, based on the calendar data, that the second member is scheduled to attend the scheduled event;
generating a data record that confirms that the scheduled event took place, and that the first member and the second member attended the scheduled event; and
storing the data record in a database associated with the first mobile device.

19. The system of claim 17, wherein the communication for the first member is a first communication, and wherein the operations further comprise:

receiving a second communication from a second mobile device via a transceiver of the first mobile device, the second communication including a second member identifier of the second member, the second member identifier being associated with the second mobile device, the second communication being broadcast by the second mobile device and indicating that the second mobile device is available to establish one or more wireless peer-to-peer connections between the second mobile device and one or more other mobile devices;

in response to the receiving of the second communication, determining, based on the second member identifier, that the second member is one of a plurality of members of the SNS; and facilitating an establishing of a wireless peer-to-peer connection with the second mobile device based on the determining that that the second member is one of the plurality of members of the SNS.

20. A non-transitory machine-readable medium comprising instructions that, when executed by one or more hardware processors of a machine, cause the machine to perform operations comprising:

accessing, at a record of a database, calendar data that pertains to an electronic calendar of a first member of a social networking service (SNS);

identifying a scheduled event based on the calendar data of the first member of the SNS;

at a first mobile device associated with the first member of the SNS, determining that the first member and a second member of the SNS attended the scheduled event based on an automatically-determined proximity of a second mobile device associated with the second member to the first mobile device associated with the first member, the proximity of the second mobile device being automatically determined by the first mobile device using low energy proximity sensing technology on the first mobile device;

at the first mobile device, generating a first communication for the first member, the first communication including a prompt to connect with the second member via the SNS, the generating of the first communication being in response to the determining that the first member and the second member attended the scheduled event, the prompt referencing the scheduled event attended by both the first member and the second member; and causing display of a user interface of the first mobile device based on the generating, at the first mobile device, of the first communication including the prompt to connect the first member and the second member via the SNS, the user interface of the first mobile device displaying the first communication including the prompt in the user interface of the first mobile device, the user interface of the first mobile device further displaying a user interface element for replying to the prompt, a selection of the user interface element resulting in a second communication including an invitation to connect via the SNS being automatically generated and transmitted to the second mobile device, the generation of the first communication and the causing display of the user interface of the first mobile device improving a computer system associated with the first mobile device based on obviating one or more requests, received at the first mobile device, pertaining to the scheduled event referenced in the prompt included in the first communication displayed in the user interface of the first mobile device.

* * * * *

UNITED STATES PATENT AND TRADEMARK OFFICE
CERTIFICATE OF CORRECTION

PATENT NO. : 10,375,004 B2  
APPLICATION NO. : 14/530490  
DATED : August 6, 2019  
INVENTOR(S) : Akhilesh Gupta Page 1 of 1

It is certified that error appears in the above-identified patent and that said Letters Patent is hereby corrected as shown below:

On the Title Page

Item [54], delete "NETWORK" and insert --NETWORKING-- therefor

Item [71], delete "Redwood," and insert --Redmond,-- therefor

In the Specification

Column 1, Line 1, delete "NETWORK" and insert --NETWORKING-- therefor

In the Claims

Column 34, Line 1, Claim 5, after "that", insert --the first--

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*